US011796363B2

(12) United States Patent
Rensing et al.

(10) Patent No.: US 11,796,363 B2
(45) Date of Patent: Oct. 24, 2023

(54) PREDICTING AND REDUCING NOISE IN A VIBRATORY METER

(71) Applicant: Micro Motion, Inc., Boulder, CO (US)

(72) Inventors: Matthew Joseph Rensing, Cincinnati, OH (US); Christopher George Larsen, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 764 days.

(21) Appl. No.: 16/639,680

(22) PCT Filed: Sep. 21, 2017

(86) PCT No.: PCT/US2017/052780
§ 371 (c)(1),
(2) Date: Feb. 17, 2020

(87) PCT Pub. No.: WO2019/040089
PCT Pub. Date: Feb. 28, 2019

(65) Prior Publication Data
US 2020/0264024 A1 Aug. 20, 2020

Related U.S. Application Data

(60) Provisional application No. 62/549,457, filed on Aug. 24, 2017.

(51) Int. Cl.
*G01F 1/74* (2006.01)
*G01F 1/84* (2006.01)
(Continued)

(52) U.S. Cl.
CPC ............... *G01F 1/74* (2013.01); *G01F 1/8431* (2013.01); *G01F 1/8436* (2013.01); *G01F 25/10* (2022.01); *G01N 9/002* (2013.01)

(58) Field of Classification Search
CPC .......... G01F 1/74; G01F 25/10; G01F 1/8431; G01F 1/8436; G01N 9/002
See application file for complete search history.

(56) References Cited

U.S. PATENT DOCUMENTS

| 11,067,423 B2 * | 7/2021 | Keeney-Ritchie .... G01F 1/8422 |
| 2007/0006666 A1 | 1/2007 | Henry |
| 2015/0229353 A1 | 8/2015 | Berthelsen et al. |

FOREIGN PATENT DOCUMENTS

| JP | 2012168045 A | 9/2012 |
| WO | 9703339 A1 | 1/1997 |
| WO | 2017019012 A1 | 4/2017 |

OTHER PUBLICATIONS

He et al., "Vibration Sensor Data Denoising Using a Time-Frequency Manifold for Machinery Fault Diagnosis", 2014, MDPI Journal, 14 edition, pp. 382-402 (Year: 2014).*

* cited by examiner

*Primary Examiner* — Elias Desta
(74) *Attorney, Agent, or Firm* — The Ollila Law Group LLC

(57) ABSTRACT

A vibratory meter (5, 1600) configured to predict and reduce noise in the vibratory meter (5, 1600). The vibratory meter (5, 1600) includes a sensor assembly (10, 1610) and a meter electronics (20, 1620) in communication with the sensor assembly (10, 1610). The meter electronics (20, 1620) is configured to provide a drive signal to a sensor assembly (10, 1610), receive a sensor signal from the sensor assembly (10, 1610) having one or more components, and generate a signal to be applied to one of the sensor signal and the drive signal to compensate for the one or more components.

22 Claims, 19 Drawing Sheets

(51) Int. Cl.
*G01N 9/00* (2006.01)
*G01F 25/10* (2022.01)

PREDICTING AND REDUCING NOISE IN A VIBRATORY METER

TECHNICAL FIELD

The embodiments described below relate to noise in sensor signals in a vibratory meter and, more particularly, to predicting and reducing noise in a vibratory meter.

BACKGROUND

Vibrating meters, such as for example, Coriolis mass flow meters, liquid density meters, gas density meters, liquid viscosity meters, gas/liquid specific gravity meters, gas/liquid relative density meters, and gas molecular weight meters, are generally known and are used for measuring characteristics of fluids. Generally, meters comprise a sensor assembly and an electronics portion. The material within the sensor assembly may be flowing or stationary. Each type of sensor may have unique characteristics, which a meter must account for in order to achieve optimum performance. For example, some sensors may require a tube apparatus to vibrate at particular displacement levels. Other sensor assembly types may require special compensation algorithms.

The meter electronics, among performing other functions, typically include stored sensor calibration values for the particular sensor being used. For example the meter electronics may include a reference stiffness measurement. The reference or baseline stiffness measurement represents a fundamental measurement performance of the sensor geometry for a specific sensor assembly, as measured in the factory under reference conditions or when it was last calibrated. A change between the stiffness measured after a vibratory meter is installed at a customer site and a reference sensor stiffness may represent physical change in the sensor assembly due to coating, erosion, corrosion, or damage to conduits in the sensor assembly, in addition to other causes. A meter verification or health check test can detect these changes.

The meter verification test is typically performed using a multi-component drive signal, which may also be referred to as a multi-tone drive signal, that is applied to a driver of the sensor assembly. A multi-tone drive signal is typically comprised of a resonant component, or drive tone, that is at the resonance frequency of a sensor assembly and a plurality of non-resonance, or test tones, that are spaced apart from the drive tone. This is distinct from an approach where multiple test tones are cycled sequentially. Any time-variance in the system (e.g. temperature-dependent effects, changes in flow) could corrupt the frequency response characterization of the sensor assembly if the sequential tone approach is used. The multi-tone drive signal is advantageous because the sampled data is obtained simultaneously.

Each test tone in the multi-tone drive signal is an input for a frequency response function of the sensor assembly. The tones or components in the output of the sensor assembly are compared to the corresponding test tones to determine a frequency response of the sensor assembly. If coating, erosion, corrosion, or damage occurs to the sensor assembly, the frequency response of the sensor assembly will change. However, the multi-tone approach can induce intermodulation distortion. More specifically, the tones in the multi-tone drive signal can induce intermodulation signals that may lie on or about a frequency of one of the tones. These intermodulation distortion signals are not characterized and therefore can cause the frequency response of the sensor assembly to change without any underlying changes to the sensor assembly. That is, the intermodulation distortion signals are noise in the sensor signals. Accordingly, there is a need to predict and reduce the noise in the vibratory meter.

SUMMARY

A vibratory meter configured to predict and reduce noise in the vibratory meter is provided. According to an embodiment, the vibratory meter comprises a sensor assembly and a meter electronics in communication with the sensor assembly. The meter electronics is configured to provide a drive signal to a sensor assembly, receive a sensor signal from the sensor assembly having one or more components, and generate a signal to be applied to one of the sensor signal and the drive signal to compensate for the one or more components.

A method of reducing noise in a sensor signal in a vibratory meter is provided. According to an embodiment, the method comprises providing a drive signal to a sensor assembly in the vibratory meter, receiving the sensor signal from the sensor assembly in response to the drive signal, the sensor signal including one or more components, and generating a signal to be applied to at least one of the drive signal and the sensor signal to compensate for the one or more components.

A method of predicting and reducing noise in a sensor signal in a vibratory meter is provided. According to an embodiment, the method comprises determining an output signal from a non-linear model of a sensor assembly of the vibratory meter, the output signal being in response to an input signal having two or more components, and adjusting a filter to attenuate one or more components in the output signal.

Aspects

According to an aspect, a vibratory meter (5, 1600) configured to predict and reduce noise in the vibratory meter (5, 1600) comprises a sensor assembly (10, 1610) and a meter electronics (20, 1620) in communication with the sensor assembly (10, 1610). The meter electronics (20, 1620) is configured to provide a drive signal to a sensor assembly (10, 1610), receive a sensor signal from the sensor assembly (10, 1610) having one or more components, and generate a signal to be applied to one of the sensor signal and the drive signal to compensate for the one or more components.

Preferably, the meter electronics (20, 1620) being configured to generate the signal to be applied to one of the sensor signal and the drive signal comprises generating the signal based on a system model of the sensor assembly (10, 1610).

Preferably, the system model of the sensor assembly (10, 1610) comprises a non-linear model of a transducer in the sensor assembly (10, 1610).

Preferably, the meter electronics (20, 1620) being configured to generate the signal to be applied to the drive signal comprises generating the signal to induce a motion in the sensor assembly (10, 1610) that substantially prevents the one or more components in the sensor signal from forming.

Preferably, the meter electronics (20, 1620) being configured to generate the signal to be applied to the sensor signal comprises generating the signal to cancel the one or more components in the sensor signal.

Preferably, the one or more components comprise at least one of intermodulation distortion signals and harmonic signals.

Preferably, the drive signal comprises a multi-tone drive signal including a drive tone and one or more test tones for verifying the sensor assembly.

Preferably, the meter electronics (1620) comprises a compensating signal generator (1623) configured to generate the signal to be applied to the one of the sensor signal and the drive signal to compensate for the one or more components.

According to an aspect, a method of reducing noise in a sensor signal in a vibratory meter comprises providing a drive signal to a sensor assembly in the vibratory meter, receiving the sensor signal from the sensor assembly in response to the drive signal, the sensor signal including one or more components, and generating a signal to be applied to at least one of the drive signal and the sensor signal to compensate for the one or more components.

Preferably, generating the signal to be applied to one of the sensor signal and the drive signal comprises generating the signal based on a system model of the sensor assembly.

Preferably, the system model of the sensor assembly comprises a non-linear model of a transducer in the sensor assembly.

Preferably, generating the signal to be applied to the drive signal comprises generating the signal to induce a motion in the sensor assembly that substantially prevents the one or more components in the sensor signal from forming.

Preferably, generating the signal to be applied to the sensor signal comprises generating the signal to cancel the one or more components in the sensor signal. Preferably, the one or more components comprise at least one of intermodulation distortion signals and harmonic signals.

Preferably, the drive signal comprises a multi-tone drive signal including a drive tone and one or more test tones for verifying the sensor assembly.

Preferably, the signal to be applied to the one of the sensor signal and the drive signal to compensate for the one or more components is generated by a compensating signal generator in a meter electronics of the vibratory meter.

According to an aspect, a method of predicting and reducing noise in a sensor signal in a vibratory meter comprises determining an output signal from a non-linear model of a sensor assembly of the vibratory meter, the output signal being in response to an input signal having two or more components, and adjusting a filter to attenuate one or more components in the output signal.

Preferably, adjusting the filter to attenuate the one or more components in the output signal comprises adjusting a frequency of one or more stop-bands of a magnitude response of the filter to be substantially centered at the frequencies of the one or more components in the output signal.

Preferably, adjusting the filter to attenuate the one or more components in the output signal comprises adjusting an attenuation of at least one stop-band to reduce the one or more components to a desired amplitude.

Preferably, adjusting the filter to attenuate the one or more components in the output signal comprises reducing the number of taps of the filter.

Preferably, the non-linear model of the sensor assembly comprises a non-linear model of a transducer of the sensor assembly.

Preferably, the non-linear model of the sensor assembly is a gain-position model of the sensor assembly.

Preferably, the one or more components of the input signal comprises one or more tones spaced apart from each other.

Preferably, determining the output signal from a non-linear model in response to the input signal having two or more components comprises determining at least one of an intermodulation distortion signal and a harmonic signal in the output signal.

BRIEF DESCRIPTION OF THE DRAWINGS

The same reference number represents the same element on all drawings. It should be understood that the drawings are not necessarily to scale.

FIG. 10 shows a graph 1000 illustrating a detailed view of the fundamental intermodulation distortion signal group 930*a* and the input signal plot 940 shown in

FIG. 9.

DETAILED DESCRIPTION

FIGS. 1-17 and the following description depict specific examples to teach those skilled in the art how to make and use the best mode of embodiments of predicting and reducing noise in a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of predicting and reducing noise in the vibratory meter. As a result, the embodiments described below are not limited to the specific examples described below, but only by the claims and their equivalents.

The noise can be reduced by generating a compensating signal. The compensating signal can be an inverse weighted signal that is applied to a drive signal provided to a sensor assembly in the vibratory meter. The compensating signal may be a canceling signal that is applied to a sensor signal provided by the sensor assembly. The inverse weighted signal can prevent the noise in the sensor signal from forming whereas the canceling signal can attenuate the noise in the sensor signal. The compensating signal can be generated using a system model of the sensor assembly. For example, the system model may be a non-linear model of a transducer in the sensor assembly, such as pick-off sensors in the sensor assembly. The system model can be determined analytically or by using empirical data, such as pull data of the transducer. The non-linear model can also be used to design and select (e.g., in situ) filters that attenuate the noise.

Figure 1:
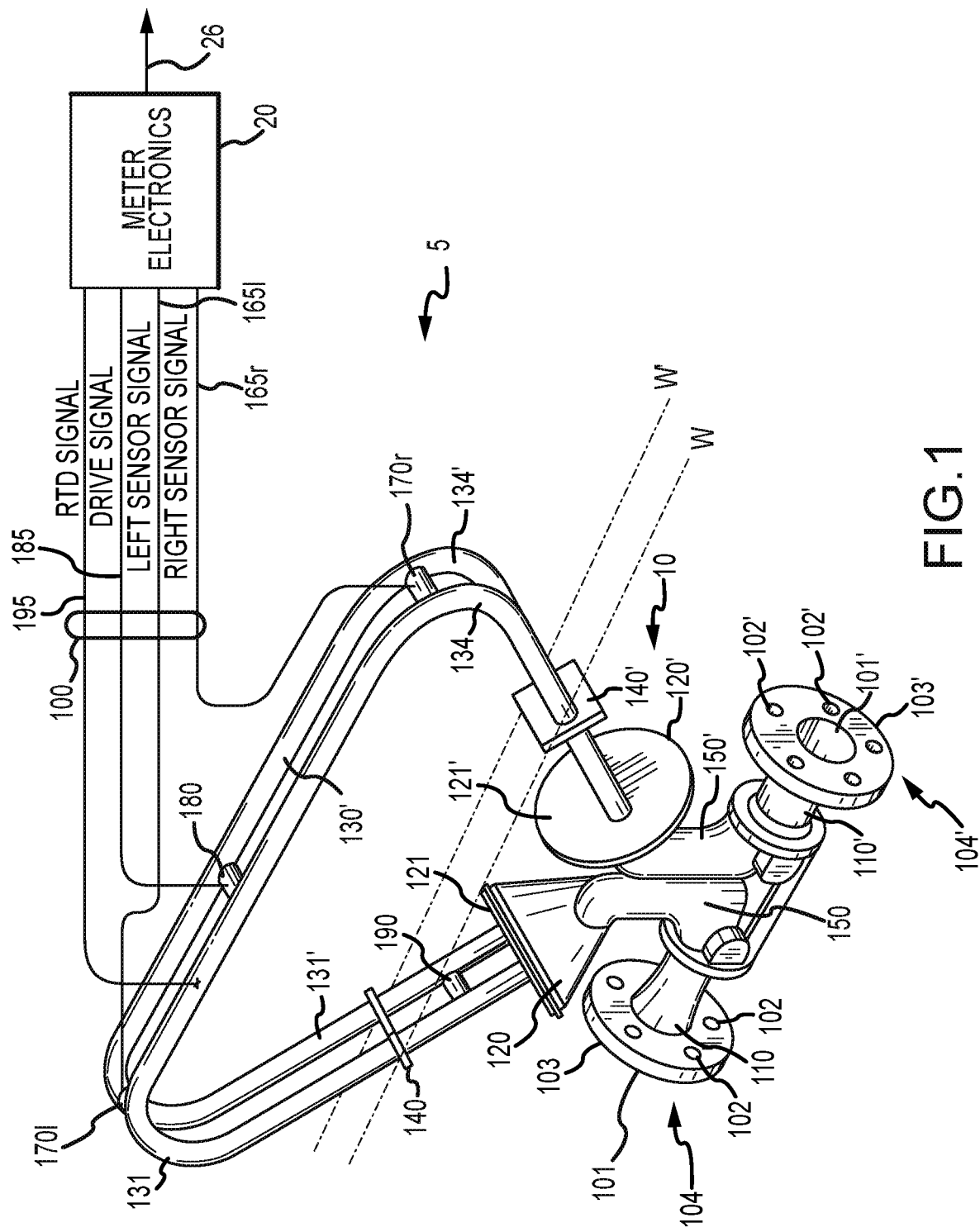
FIG. 1 shows a vibratory meter 5 using frequency spacings to prevent intermodulation distortion signal interference.

FIG. 1 shows a vibratory meter 5 using frequency spacings to prevent intermodulation distortion signal interference. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over path 26, as well as other information.

The sensor assembly 10 includes a pair of manifolds 150 and 150', flanges 103 and 103' having flange necks 110 and 110', a pair of parallel conduits 130 and 130', drive mechanism 180, resistive temperature detector (RTD) 190, and a pair of pick-off sensors 170*l* and 170*r*. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by drive mechanism 180 in opposite directions about their respective bending axes W and W' and at what is termed the first out-of-phase bending mode of the flow meter. This drive mechanism 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the drive mechanism 180.

The meter electronics 20 receives the RTD temperature signal on lead 195, and the left and right sensor signals appearing on leads 100 carrying the left and right sensor signals 165*l*, 165*r*, respectively. The meter electronics 20 produces the drive signal appearing on lead 185 to drive mechanism 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over path 26 as a signal.

Intermodulation Distortion Signals

Figure 2:
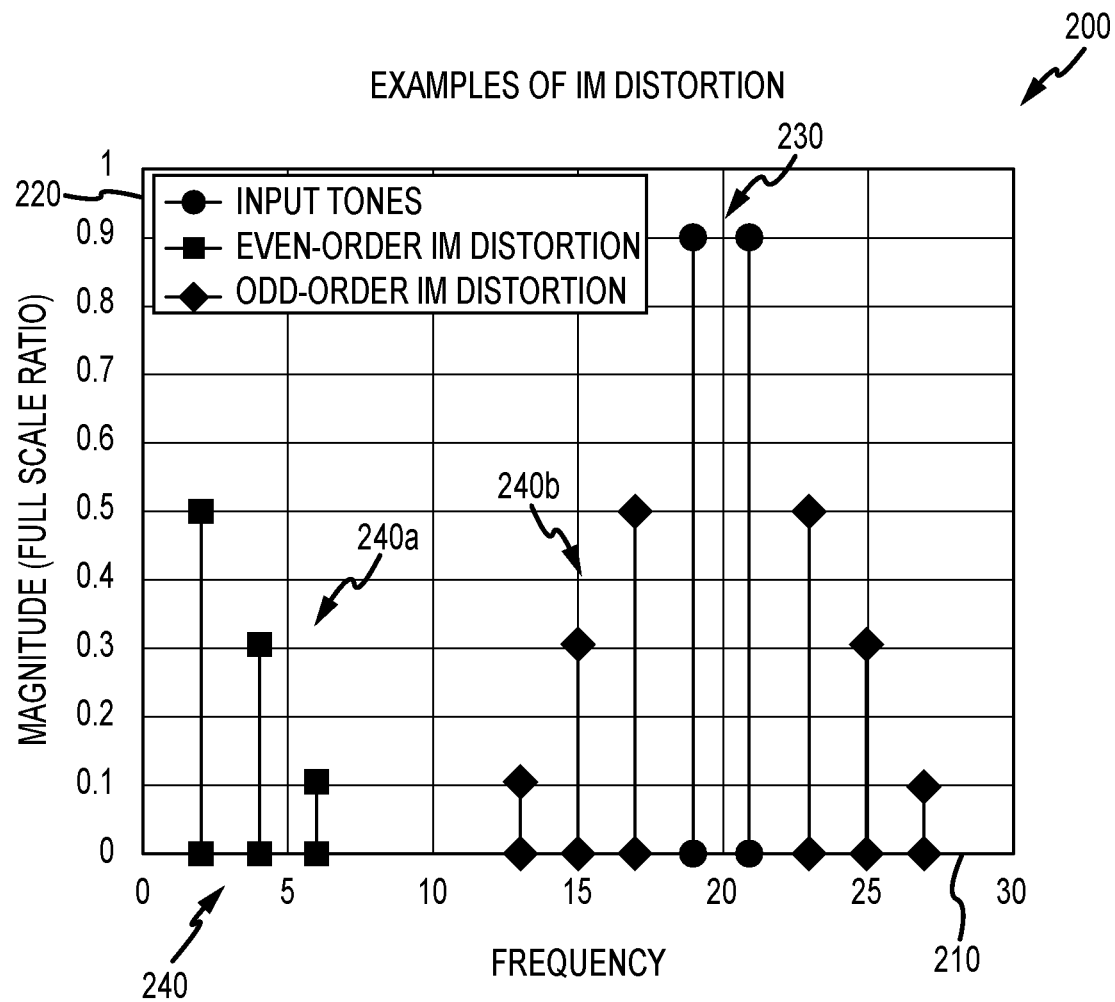
FIG. 2 shows a graph 200 illustrating intermodulation distortion signals in a multi-tone drive signal.

FIG. 2 shows a graph 200 illustrating intermodulation distortion signals in a multi-tone drive signal. As shown in FIG. 2, the graph 200 includes a frequency axis 210 and a magnitude axis 220. The frequency axis is in units of hertz (Hz) and ranges from 0 to 30. The magnitude axis 220 is a full scale ratio and ranges from 0 to 1. The graph 200 also includes two signals 230, which are symmetrically centered about 20 Hz. As shown in FIG. 2, the graph 200 includes intermodulation distortion signals 240, which are comprised of even-order intermodulation distortion signals 240*a* and odd-order intermodulation distortion signals 240*b*.

The two signals 230 are shown as being symmetrically centered about 20 Hz and have a magnitude of about 0.9. The two signals 230 may be provided to, for example, the sensor assembly 10 described above with reference to FIG. 1 using a multi-tone drive signal. More specifically, the multi-tone drive signal may be comprised of the two signals 230 that are provided to the drive mechanism 180.

The intermodulation distortion signals 240 may be in the sensor signals on the leads 100 and may be caused by the meter electronics 20 or the sensor assembly 10. For example, the intermodulation distortion signals 240 may be generated due to the multi-tone drive signal being close to or at a saturation of an amplifier in the meter electronics 20. The intermodulation distortion signals 240 may also be due to non-linearities in sensor assembly 10, such as the pickoff sensors 170*l*, 170*r* and the drive mechanism 180, or other devices or structures in the sensor assembly 10. The frequencies of the intermodulation distortion signals 240 are at multiples of a difference between the frequencies of the two signals 230. As can be appreciated, as more input signals are added, the number of intermodulation distortion signals increase, which can cause one or more of the intermodulation distortion signals to have the same frequencies of the input signals.

Figure 3:
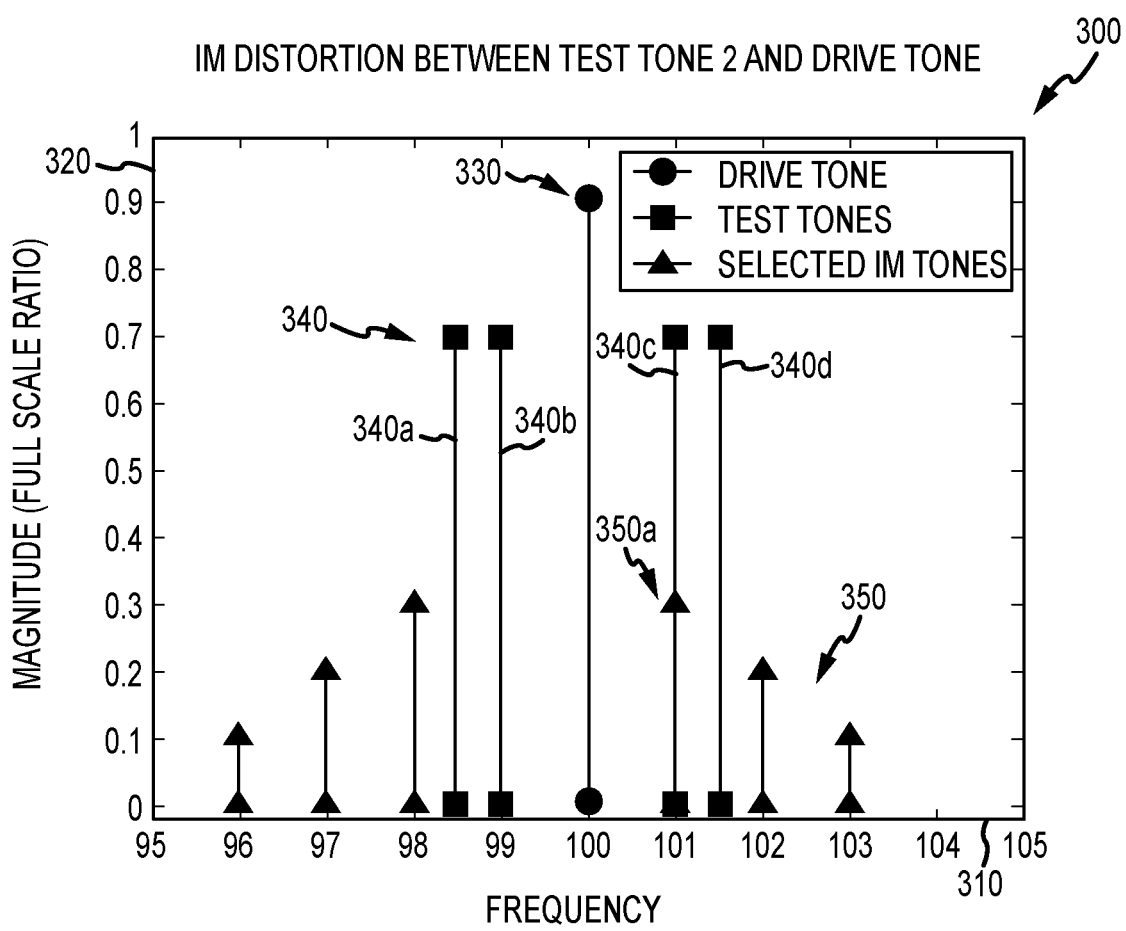
FIG. 3 shows a graph 300 illustrating intermodulation distortion.

FIG. 3 shows a graph 300 illustrating intermodulation distortion. As shown in FIG. 3, the graph 300 includes a frequency axis 310 and a magnitude axis 320. The frequency axis 310 is in units of hertz (Hz) and ranges from 95 to 105 Hz. The magnitude axis 320 is a full scale ratio and ranges from 0 to 1. The graph 300 includes a first signal 330, which is labeled as a 'drive tone' and may be a resonant component of a multi-tone drive signal. The first signal 330 has a frequency of 100 Hz.

Also shown are test tones 340, which may be non-resonant components (e.g., not at the resonant frequency of a sensor assembly) of the multi-tone drive signal. The test tones 340 are comprised of a second through fifth signal 340a-340d. The graph 300 also includes intermodulation distortion signals 350. For clarity and discussion purposes, all of the possible intermodulation distortion signals are not shown. Instead, the intermodulation distortion signals 350 shown in FIG. 3 are generated from the first signal 330 and the third signal 340b. One of the intermodulation distortion signals 350 is an interfering signal 350a that has the same frequency as the fourth signal 340c. The test tones 340 may be injected into a drive signal, such as the drive signal appearing on lead 185 in the vibratory meter 5. Accordingly, the drive signal appearing on the lead 185 may be comprised of the first signal 330 and the second through fifth signals 340a-340d. The magnitudes of the second through fifth signals 340a-340d may be measured and used to characterize the sensor assembly 10. For example, a magnitude ratio of an output corresponding to one of the second through fifth signals 340a-340d can characterize a response of the sensor assembly 10 at that frequency. By utilizing four test tones at different frequencies, a frequency response of the sensor assembly 10 over a range of frequencies can be approximated. However, since the interfering signal 350a, which is at the same frequency as the fourth signal 340c, is not one of the test tones 340 and is not measured as an input for a frequency response, the frequency response of the sensor assembly 10 is incorrect and, therefore, may not correctly detect erosion, corrosion, deposits, etc.

The frequency of the interfering signal 350a can be changed by changing the frequency spacing between the first signal 330 and the third signal 340b. More specifically, the frequency of the interfering signal 350a may be a multiple of a difference between the frequency of the first signal 330 and the third signal 340b. Accordingly, increasing or decreasing the frequency of the third signal 340b will increase or decrease the frequency of the interfering signal 350a. This will move the interfering signal 350a away from the fourth signal 340c, thereby preventing the interfering signal 350a from being included in characterizing the frequency response of the sensor assembly 10.

However, simply moving the interfering signal 350a away from the fourth signal 340c may not prevent the interfering signal 350a from being included in characterizing the frequency response of the sensor assembly 10. For example, even if the frequency of the interfering signal 350a is different than the frequency of the fourth signal 340c, the interfering signal 350a may still be within a demodulation window and, therefore, induce interfering components in the response signal from the sensor assembly.

Frequency Spacings

Figure 4:
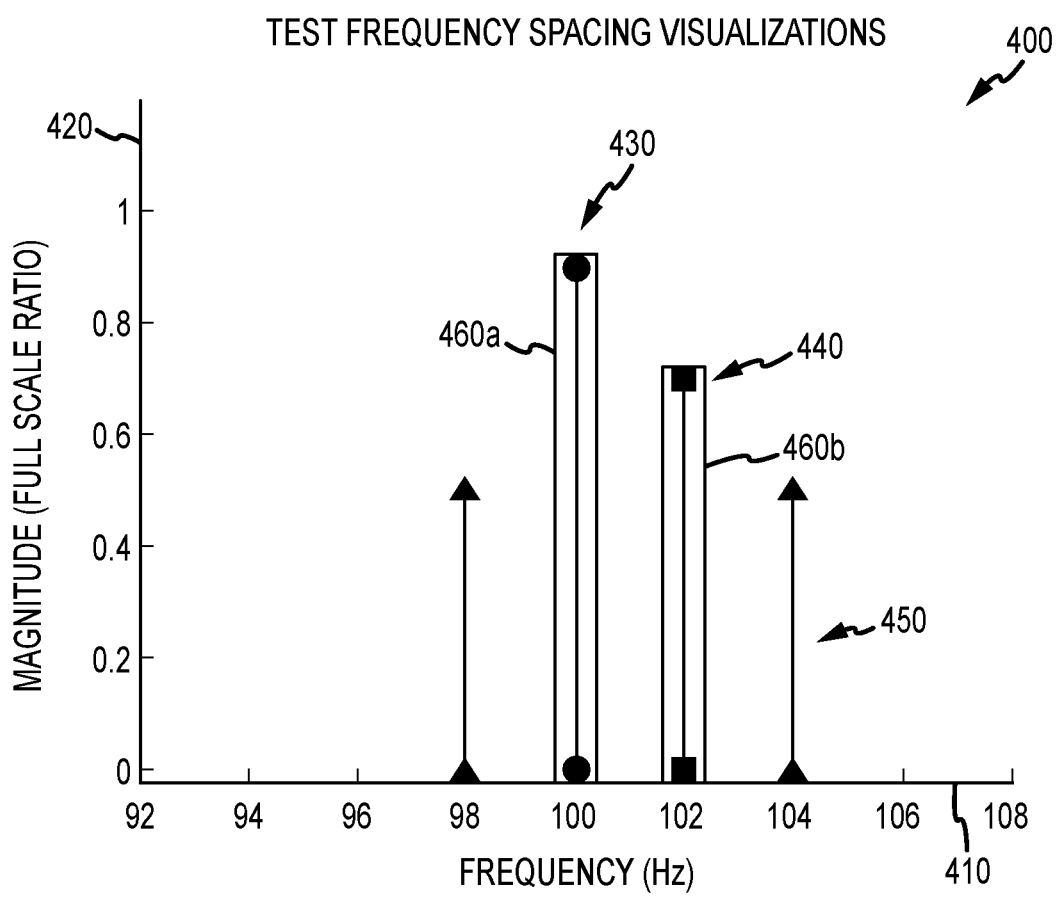
FIG. 4 shows a graph 400 illustrating frequency spacings of tones that can induce intermodulation distortion signals.

FIG. 4 shows a graph 400 illustrating frequency spacings of tones that can induce intermodulation distortion signals. As shown in FIG. 4, the graph 400 includes a frequency axis 410 and a magnitude axis 420. The frequency axis 410 is in units of hertz (Hz) and ranges from 92 to 108 Hz. The magnitude axis 420 is a full scale ratio and ranges from 0 to 1. The graph 400 includes a first signal 430, which may be a drive tone or resonant signal at the resonant frequency of a sensor assembly. Also shown is a second signal 440, which may be a test tone that is a non-resonant component of the multi-tone drive signal, and intermodulation distortion signals 450. Also shown in FIG. 4 is a first demodulation window 460a associated with the first signal 430 and a second demodulation window 460b associated with the second signal 440.

The first and second demodulation windows 460a, 460b may be frequency ranges about the frequencies of the first and second signals 430, 440 that allow the first and second signals 430, 440 to pass. For example, the first and second demodulation windows 460a, 460b may be about 1 Hz wide. Accordingly, the demodulation window for the first signal 430 may range from about 99.5 Hz to about 100.5 Hz. The demodulation window for the second signal 440 may range from about 101.5 Hz to about 102.5 Hz. The intermodulation distortion signals 450 are at frequencies of 98 and 104 Hz, which are not within the first and second demodulation window 460a, 460b. As a result, the intermodulation distortion signals 450 are not included in determining the frequency response of the sensor assembly 10.

Figure 5:
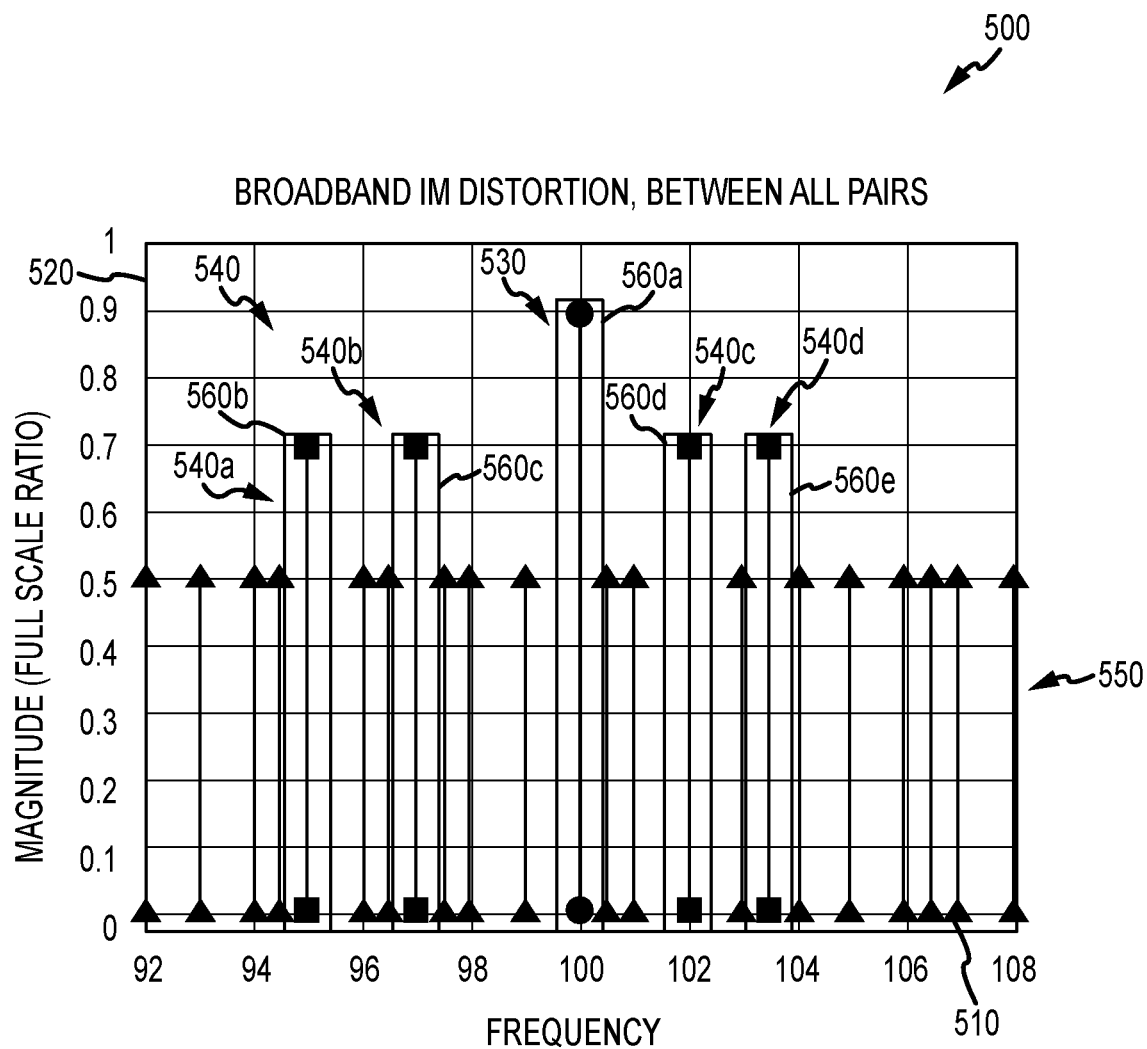
FIG. 5 shows a graph 500 illustrating frequency spacings of tones that can induce intermodulation distortion signals.

FIG. 5 shows a graph 500 illustrating frequency spacings of tones that can induce intermodulation distortion signals. As shown in FIG. 5, the graph 500 includes a frequency axis 510 and a magnitude axis 520. The frequency axis 510 is in units of hertz (Hz) and ranges from 92 to 108 Hz. The magnitude axis 520 is a full scale ratio and ranges from 0 to 1. The graph 500 includes a first signal 530, which may be a drive tone or signal at a resonant frequency of a sensor assembly. Also shown are test tones 540, which is comprised of a second signal 540a, a third signal 540b, a fourth signal 540c, and a fifth signal 540d and may be non-resonant sinusoidal components of a multi-tone drive signal. The graph 500 also includes intermodulation distortion signals 550. Demodulation windows 560 associated with the first signal 530 and the test tones 540 are also shown. The demodulation windows 560 include a first through fifth demodulation window 560a-560e that are respectively associated with the first through fifth signal 530, 540a-540d.

The first signal 530 and the second through fifth signal 540a-540d may comprise a multi-tone drive signal on the lead 185. The first signal 530 may be at a resonant frequency of a sensor assembly, which is shown as being 100 Hz. The second, third, fourth, and fifth signals 540a-540d are shown to be respectively at 95, 97, 102, and 103.5 Hz. The second through fifth signals 540a-540d are offset from the first signal 530, and each other, with frequency spacings. The frequency spacings may be selected to ensure that the intermodulation distortion signals 550 are not within the first through fifth demodulation windows 560a-560e, as is shown in FIG. 5. More specifically, all of the frequencies of the intermodulation distortion signals 550 may be determined for various frequency spacings of the first signal 530 and the second through fifth signals 540a-540d. As can be appreciated, other frequency spacings may result in intermodulation distortion signals 550 that are also not within the demodulation windows 560.

In addition, the sensor assembly 10 may have a range of frequencies at which the sensor assembly 10 is lightly damped, which is herein referred to as a frequency response bandwidth of the sensor assembly 10. More specifically, the sensor assembly 10 may be very lightly damped about the drive tone frequency, where the response of the sensor assembly 10 rapidly decreases away from the drive tone frequency. If the frequency spacings are too large, the first signal 530 may be centered within the frequency response bandwidth and one or more of the test tones 540 may be outside the frequency response bandwidth. This can result in a sensor signal with components having signal-to-noise ratios inadequate to characterize the frequency response of the sensor assembly 10.

To avoid this signal-to-noise ratio issue, the frequencies of the test tones 540 may be close to the frequency of the first signal 530 such that they lie within the frequency response bandwidth of the sensor assembly 10. Accordingly, it may be desirable to minimize a frequency spacing between a lowest frequency and a highest frequency of the test tones 540, which, in the embodiment of FIG. 5, are the second signal 540a and the fifth signal 540d. An example of this minimization is discussed in the following with reference to FIG. 6.

Figure 6:
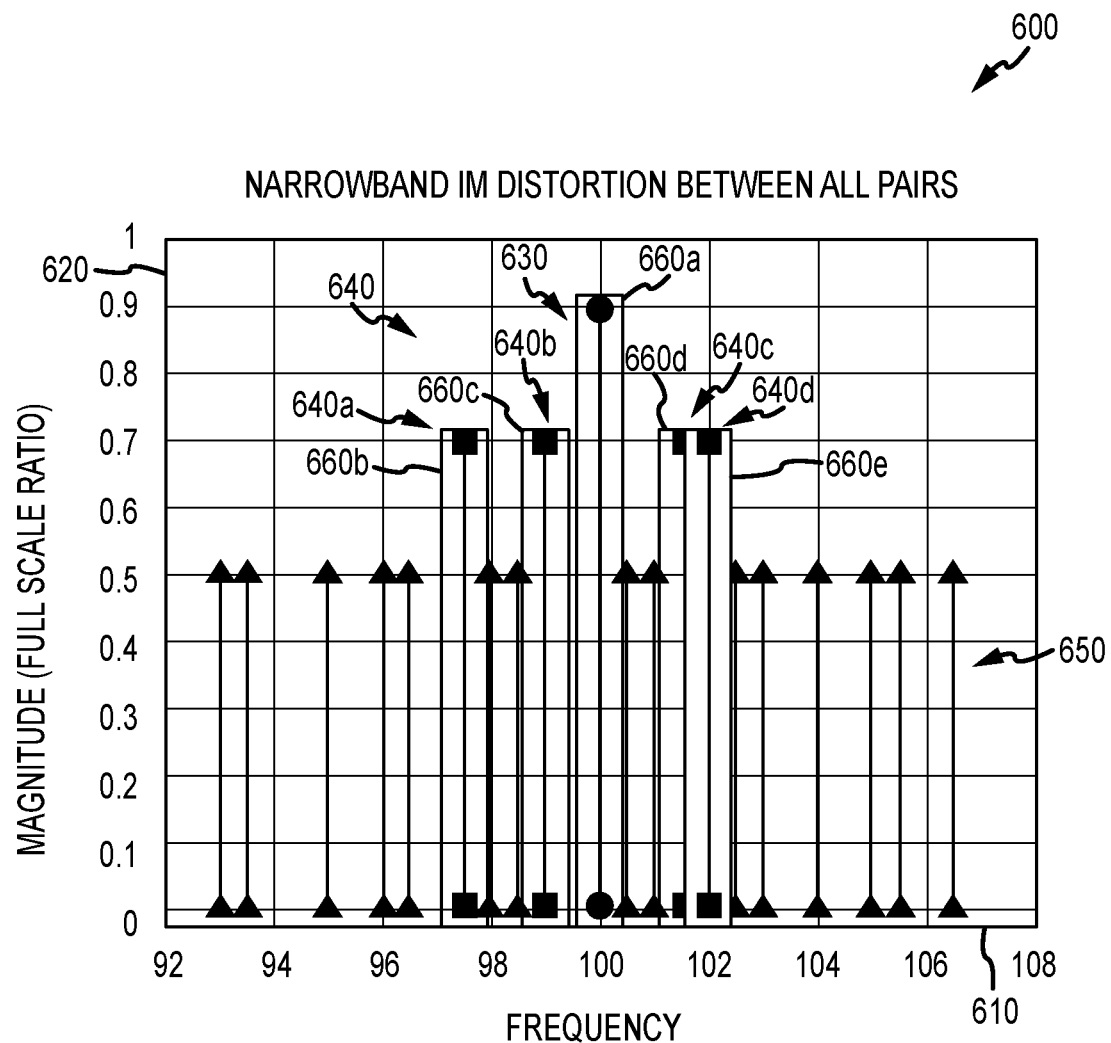
FIG. 6 shows a graph 600 illustrating frequency spacings that can induce intermodulation distortion signals.

FIG. 6 shows a graph 600 illustrating frequency spacings that can induce intermodulation distortion signals. As shown in FIG. 6, the graph 600 includes a frequency axis 610 and a magnitude axis 620. The frequency axis 610 is in units of hertz (Hz) and ranges from 92 to 108 Hz. The magnitude axis 620 is a full scale ratio and ranges from 0 to 1. The graph 600 includes a first signal 630, which may be a drive tone or signal at a resonant frequency of a sensor assembly. Also shown are test tones 640, which is comprised of a second signal 640a, a third signal 640b, a fourth signal 640c, and a fifth signal 640d. The test tones 640 may be sinusoidal components at non-resonant frequencies. The graph 600 also includes intermodulation distortion signals 650. Demodulation windows 660 associated with the first signal 630 and the test tones 640 are also shown. The demodulation windows 660 include a first through fifth demodulation window 660a-660e associated with the first signal 630 and the second signal 640a through fifth signal 640d.

As can be appreciated, the second and fifth signal 640a, 640d are closer together than the second and fifth signal 540a, 540d described above with reference to FIG. 5. The second and fifth signal 640a, 640d may be within the frequency response bandwidth of the sensor assembly. As a result, signals in the sensor signal corresponding to the test tones 640 may have acceptable signal-to-noise ratios. Additionally, some of the intermodulation distortion signals 650 are adjacent to the demodulation windows 660b-660e. More specifically, some of the intermodulation distortion signals 650 are outside, but next to, the demodulation windows 660b-660e. Therefore, the intermodulation distortion signals 650 are not passed by the demodulation windows 660b-660e, while allowing the components of the sensor signal corresponding to the test tones 640 to pass.

Accordingly, the characterization of the frequency response of the sensor assembly 10 can be more accurate by preventing the intermodulation distortion signals 650 from interfering with the signals corresponding to the test tones 640. The characterization of the frequency response may also be more accurate due to sufficient signal-to-noise ratios resulting from the closer frequency spacing between the second and fifth signal 640a, 640d.

System Model

The above discussion of the intermodulation distortion assumes that the intermodulation distortion signals are known. This assumption may in turn rely on an assumption that a system model of the sensor assembly is well-characterized. More accurate and optimized test tone spacings may be obtained if the system model more correctly predicts the response to an input by, for example, utilizing a non-linear model. This non-linear model allows for more efficient filter designs as well as noise reduction systems that do not necessarily rely on filtering, such as systems that employ compensating signals that are added to the drive or sensor signals in the vibratory meter.

Non-Linear Model of Transducer

A more accurate system model of the transducer may be a non-linear model, rather than a linear model. One example of a non-linear model may be a polynomial model. For example, the transducer may be modeled as a velocity transducer having the following relationship:

$$y(t)=k(x)\dot{x}(t),\quad [1]$$

where:
k (x) is the gain of the transducer relative to the position of the transducer; and
$\dot{x}(t)$ is the velocity.

As can be appreciated, the gain k(x) is not a constant, but varies relative to the position of, for example, a magnet in a coil. The gain k(x) can be any suitable equation, but an exemplary equation is discussed for illustrative purposes in the following.

Figure 7:
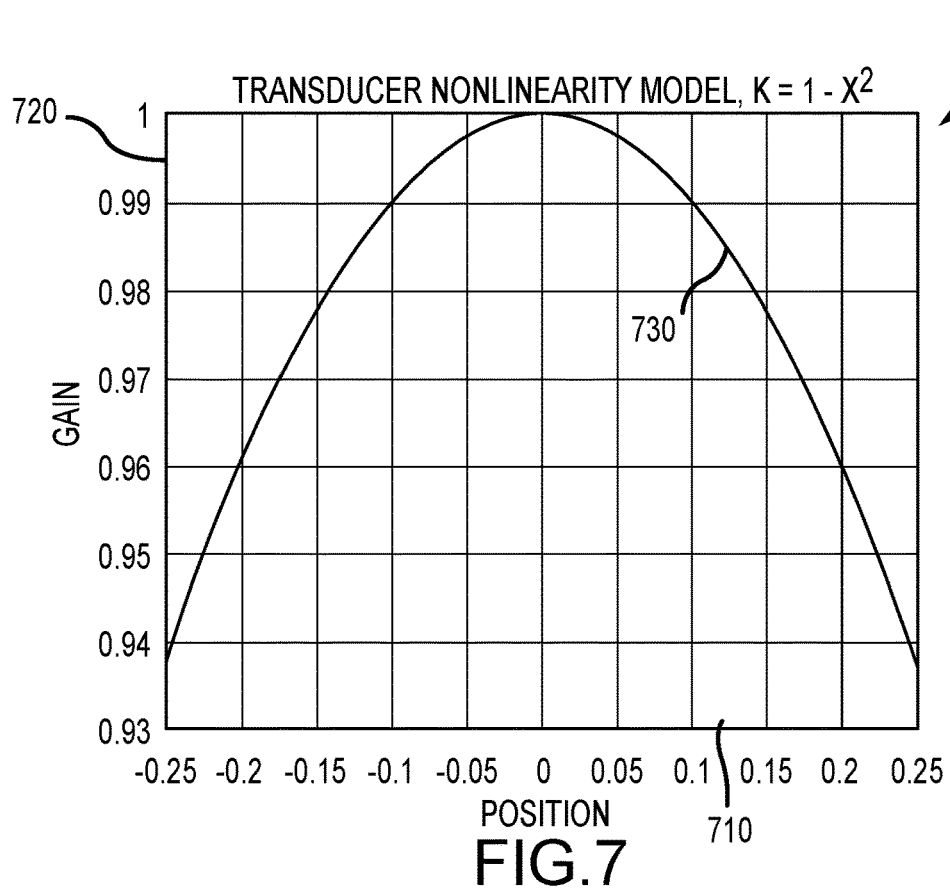
FIG. 7 shows a graph 700 of a gain of a non-linear model of a transducer for predicting and reducing noise in a vibratory meter.

FIG. 7 shows a graph 700 of a gain of a non-linear model of a transducer for predicting and reducing noise in a vibratory meter. As shown in FIG. 7, the graph 700 includes a position axis 710, which is denoted by full scale ratio of a range of motion. More specifically, in this example, a magnet centered in the coil is at position zero. When the magnet is displaced from the center towards a first end of the coil at a quarter of the full scale range of motion, the position of the transducer is −0.25. When the magnet is displaced towards a second end of the coil a quarter of the full scale range of motion, the position of the transducer is 0.25. However, any suitable measure of the position of the transducer, as well as other types of transducers, such as strain gauges, optical transducers, etc., may be employed. The graph 700 also includes a gain axis 720, which is also shown in full scale ratio of a measurement unit, such as, for example, Volts. For example, if the full scale output of the transducer is 5.00 Volts, then, at 0.95 full scale, the transducer has an output of 4.75 Volts. The graph 700 also includes a transducer model plot 730, which is shown as a parabolic curve k(x).

As shown in FIG. 7, the gain k(x) is determined by the following equation:

$$k(x)=1-x^2\quad [2]$$

To observe the effects of IM distortion, a case where the input to the system is two sine waves or tones at two different frequencies ($\omega_1,\omega_2$) and amplitudes ($A_1,A_2$) is considered:

$$x(t)=A_1\cos(\omega_1 t)+A_2\cos(\omega_2 t).\quad [3]$$

Substituting the above equations [2] and [3] into equation [1] results in the following equation [4]:

$$y(t)=\dot{x}(t)(1-x^2(t))=[-A_1\omega_1\sin(\omega_1 t)-A_2\omega_2\sin(\omega_2 t)]\\ [1-(A_1\cos(\omega_1 t)-A_2\cos(\omega_2 t))^2].\quad [4]$$

Simplifying using trigonometric identities will yield sine waves at specific amplitudes at eight different frequencies. As can be appreciated, this is an exact solution that predicts the intermodulation distortion signals (amplitude, phase, and frequency) even though the system model of the transducer is a non-linear transducer. In other words, the intermodulation distortion caused by the non-linear transducer can be predicted using a non-linear model. This result can be repeated with a generalized input and a polynomial non-linear system model, as the following discussion illustrates.

When expanding higher order terms of the polynomial, the input signal (or some derivative/integral of it) is raised to higher and higher powers. Since multinomial signals are of interest, the input will be the sum of some number of terms (sines and cosines, but at this point they can be treated as arbitrary terms). Thus, a closed-form expansion of $(x_0+x_1+x_2+\ldots+x_n)^k$ may be needed. This is a generalization of a binomial expansion $(a+b)^k$. The binomial expansion produces k+1 terms, consisting of all combinations of powers of a and b that sum to k: $a^k, a^{k-1}b, a^{k-2}b^2, \ldots, ab^{k-1}, b^k$. The multinomial expansion then consists of all combinations of powers of $x_0, x_1, \ldots, x_n$ that sum to k. The multinomial expansion can be readily implemented using a recursive algorithm. For example, the first term $x_0$ can be taken and looped through the allowed power for the first term $x_0$. For each allowed power of the first term $x_0$, the recursive algorithm can loop through all of the allowed values of the second term $x_1$, from 0 to k minus the selected power for the first term $x_0$. This recursive algorithm continues until the total power reaches k. The coefficients for the expansion may also be calculated by, for example, using the formula $$\frac{n!}{k_0!k_1!\ldots k_m!},$$

where $k_0+k_1+\ldots+k_m=n$.

An input to a system model can be generalized as a sum of sinusoids, which is represented by the following equation [5]:

$$x(t)=\Sigma_i A_i \cos \omega_i t+\Sigma_j B_1 \cos \omega_j t. \quad [5]$$

As noted above, the system nonlinearity is modeled with a polynomial of the input/output space, or some number of integrals/derivatives of this space (e.g., one might be measuring acceleration, but the system is nonlinear in terms of position). Denoting the "nonlinearity space" as $\hat{x}(t)$, our system response is written as the following equation [6]:

$$y(t)=P(\hat{x}(t))x(t), \quad [6]$$

where:
$\hat{x}(t)$ denotes the "nonlinearity space";
$P(\hat{x})$ is the nonlinearity polynomial:

$$P(\hat{x})=\Sigma_k P_k \hat{x}(t)^k, \quad [7]$$

in which k is the order of the polynomial.

In the above equation [7], the $\hat{x}^k$ term is a standard multinomial expansion whose terms are sines and cosines. More specifically, x(t) is assumed, as illustrated in the above equation [5], to be a sum of sinusoidal terms and, therefore, $\hat{x}(t)$ is also a sum of sinusoidal terms that are multinomial expansion of the sines and cosines of $\hat{x}(t)$.

Combining above equations [6] and [7] results in the following equation:

$$y(t)=\Sigma_k P_k \hat{x}(t)^k x(t). \quad [8]$$

The above equation [8] can be iterated over a few different levels of computation, as the following explains.

For each polynomial term, compute the full expansion of $\hat{x}(t)^k$. Recall that x, and therefore $\hat{x}$ as well, is assumed to be a sum of sinusoid terms. Thus $\hat{x}^k$ is a standard multinomial expansion whose terms are sines and cosines. The terms of the expansion are computed using a multinomial term technique discussed above. Given this expansion of $\hat{x}^k$, each term of the expansion is multiplied by x, which produces more terms than were originally in the expansion. This results in all the terms for $\hat{x}^k x$. At this point, N terms are summed together, each of which is the product of numerous sines and cosines.

A second loop may now be employed, where each term of the expansion is evaluated. The multinomial coefficient (i.e., the multiplier of each term, based solely on the pattern of how $\hat{x}^k$ expands) as described above, is computed for each term. This is then multiplied by the polynomial coefficient $P_k$ and the amplitudes of the sines and cosines contributing to that term. This forms a scalar associated with this particular term of the expansion. The rest of the expansion is a product of several sines and cosines. This is converted into the sum of sines or cosines at various frequencies. Information on these sinusoids (i.e., frequency, amplitude, and sine/cosine) is retained, and the loop is repeated over the next term of the expansion.

After the above procedures are completed both for every term of the expansion (e.g., the "inner loop") and for every polynomial coefficient (i.e., the "outer loop"), the result is a large number of sines and cosines, at specific frequencies and with specific amplitudes. The results are collated and any negative-frequency sinusoids are converted to their positive frequency equivalents, and sines and cosines of like frequencies are summed together. The amplitudes and frequencies of these sines and cosines are returned, forming the full output of the system.

Regardless of how the output signals are determined from a non-linear system, the non-linear system can be used to predict and reduce noise in a vibratory meter, as the following explains using a fourth-order polynomial model as an example, although any suitable non-linear system can be employed, as the above shows.

Figure 8:
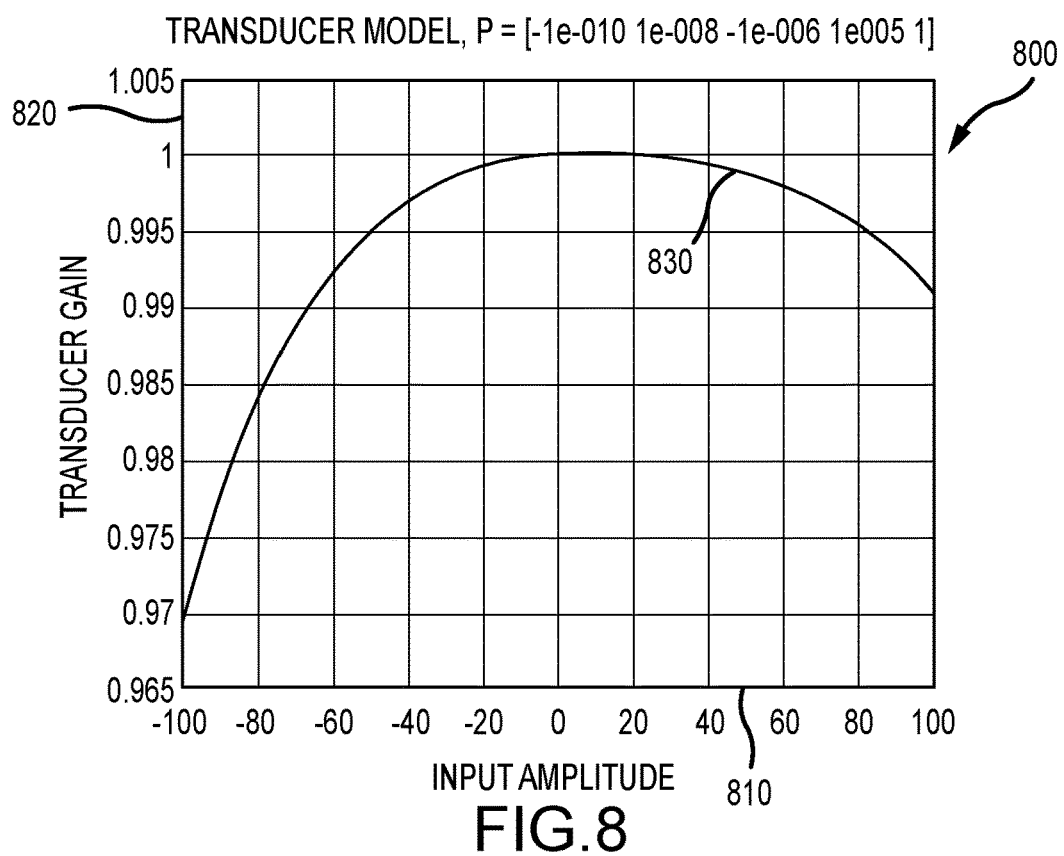
FIG. 8 shows a graph 800 of a fourth-order polynomial representation of a transducer for predicting and reducing noise in a vibratory meter.

FIG. 8 shows a graph 800 of a fourth-order polynomial representation of a transducer for predicting and reducing noise in a vibratory meter. As shown in FIG. 8, the graph 800 includes a position axis 810 and a transducer gain axis 820. The position axis 810 is shown in FIG. 8 is show in units of percentages of the full scale range of position and ranges from −100 to 100 percent. The transducer gain axis 820 is also shown in full scale ratio of, for example, volts. The transducer gain axis 820 ranges from 0.965 to 1.005. The graph 800 also includes a transducer model plot 830, which is shown as a multinomial curve, where the polynomial is a fourth order polynomial. More specifically, the transducer is modeled as a fourth order polynomial where the $P_k$ values are expressed as a vector P=[−1>$10^{-10}$ −1×$10^{-8}$ −1×$10^{-6}$ −1×$10^{-5}$ 1]. When a multi-tone signal comprised of five sinusoidal signals is combined with the polynomial P=[−1× $10^{-10}$ −1×$10^{-8}$ −1×$10^{-6}$ −1×$10^{-5}$ 1] as described above with reference to equations [5]-[8], a distortion model or signals including intermodulation distortion signals can be obtained.

Predicting the Intermodulation Distortion Signals

Figure 9:
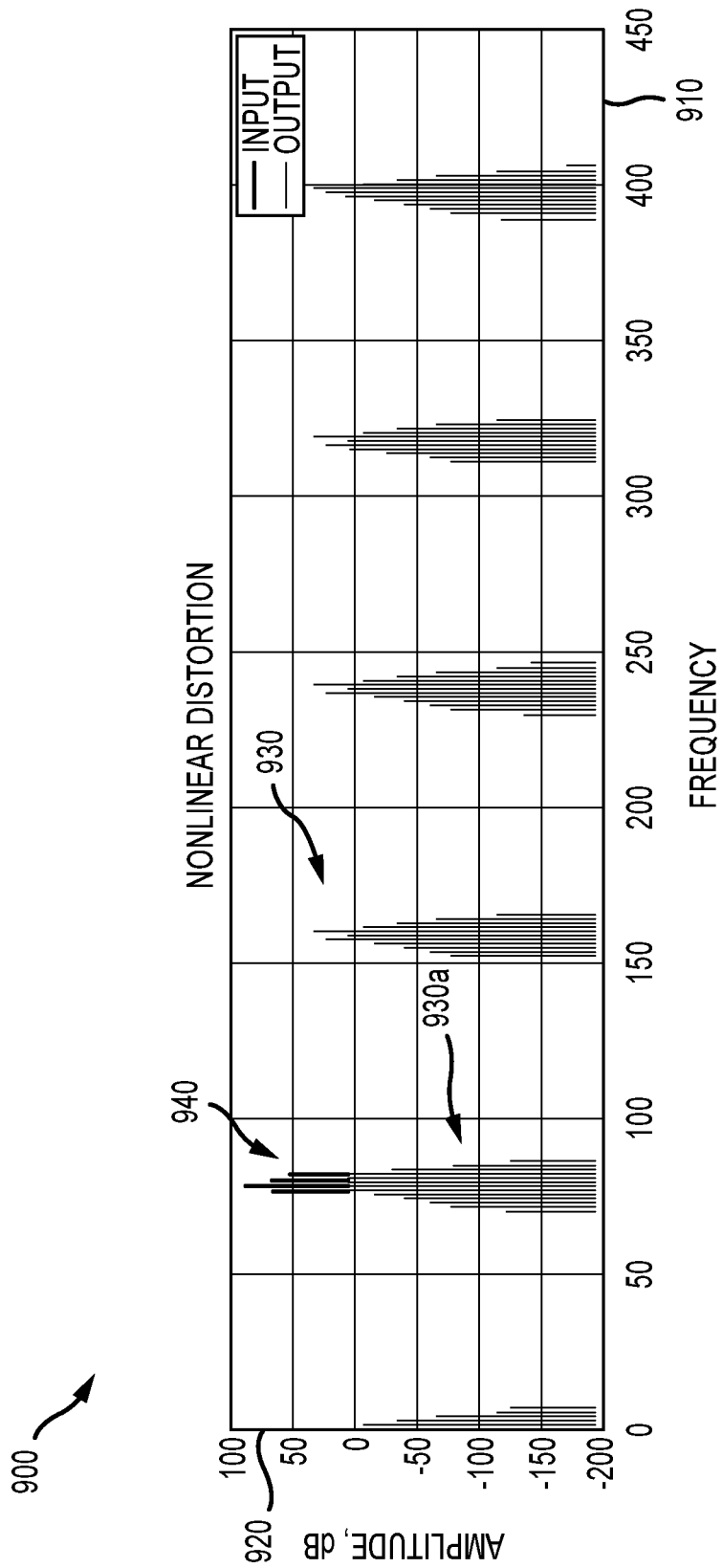
FIG. 9 shows a graph 900 of a distortion model obtained from using the fourth order polynomial model P.

FIG. 9 shows a graph 900 of a distortion model obtained from using the fourth order polynomial model P. The graph 900 includes a frequency axis 910, in units of Hertz (Hz) and an amplitude axis 920 with a dB scale due to, for example, the gain being determined from a ratio of an output and an input. The graph 900 includes an intermodulation distortion signal plot 930 and an input signal plot 940. The intermodulation distortion signal plot 930 includes a fundamental intermodulation distortion signal group 930a that is located on the frequency axis 910 at about the frequencies of the five tone signals. Although not discernable, an output signal comprised of tones that correspond to tones in the input signal plot 940 includes tones that overlay the tones of the input signal plot 940. The tones in this output signal have magnitudes that are slightly less than the magnitudes of the tones of the input signal plot 940.

Figure 10:
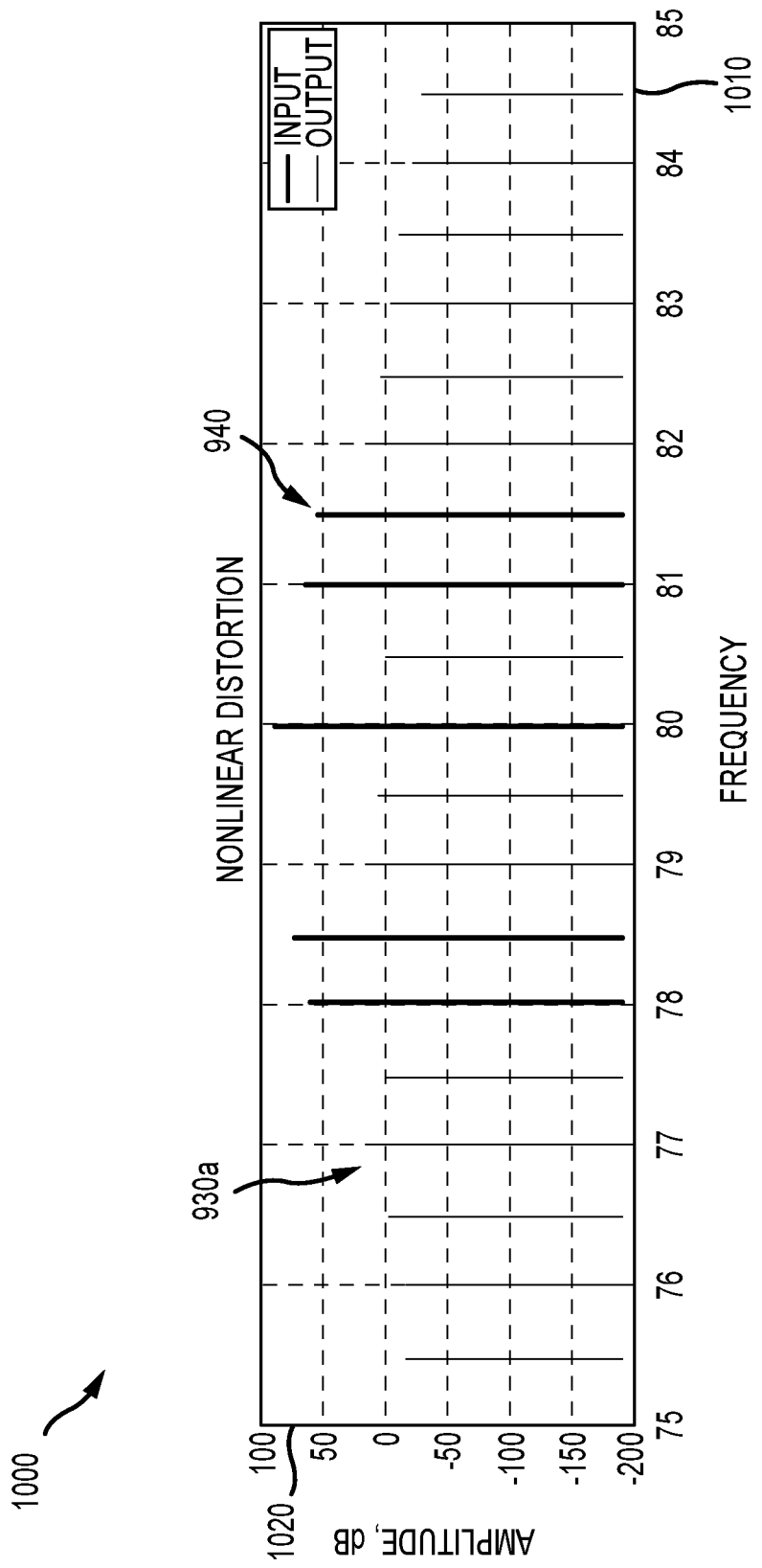

FIG. 10 shows a graph 1000 illustrating a detailed view of the fundamental intermodulation distortion signal group 930a and the input signal plot 940 shown in FIG. 9. The graph 1000 shown in FIG. 10 includes a frequency axis 1010 that ranges from 75 to 85 Hz, which is centered about the frequencies of the five tone signals, and an amplitude axis 1020 with a dB scale that ranges from −200 to 100 dB, the same as the amplitude axis 920 of the graph 900 shown in FIG. 9. The fundamental intermodulation distortion signal group 930a is comprised of the intermodulation signals that results from this combination. Although the tones in the output signal are not discernable, the tones of the output signal are within about 0.3% to 0.5% amplitude and less than 0.2% degrees phase of the tones of the input signal plot 940. The frequencies of the tones of the output signal are the same as the frequencies of the tones of the input signal plot 940.

As can be seen, the fundamental intermodulation distortion signal group 930a includes individual tones that are evenly spaced from each other. This is due to the tones of the input signal plot 940 having evenly spaced signals. In addition, several of the tones in the fundamental intermodulation distortion signal group 930a are at a significant percentage of the tones of the input signal plot 940. For example, some tones of the fundamental intermodulation distortion signal group 930a are within 30 dB of the tones of the input signal plot 940.

Fitting a Non-Linear Model

Figure 11A:
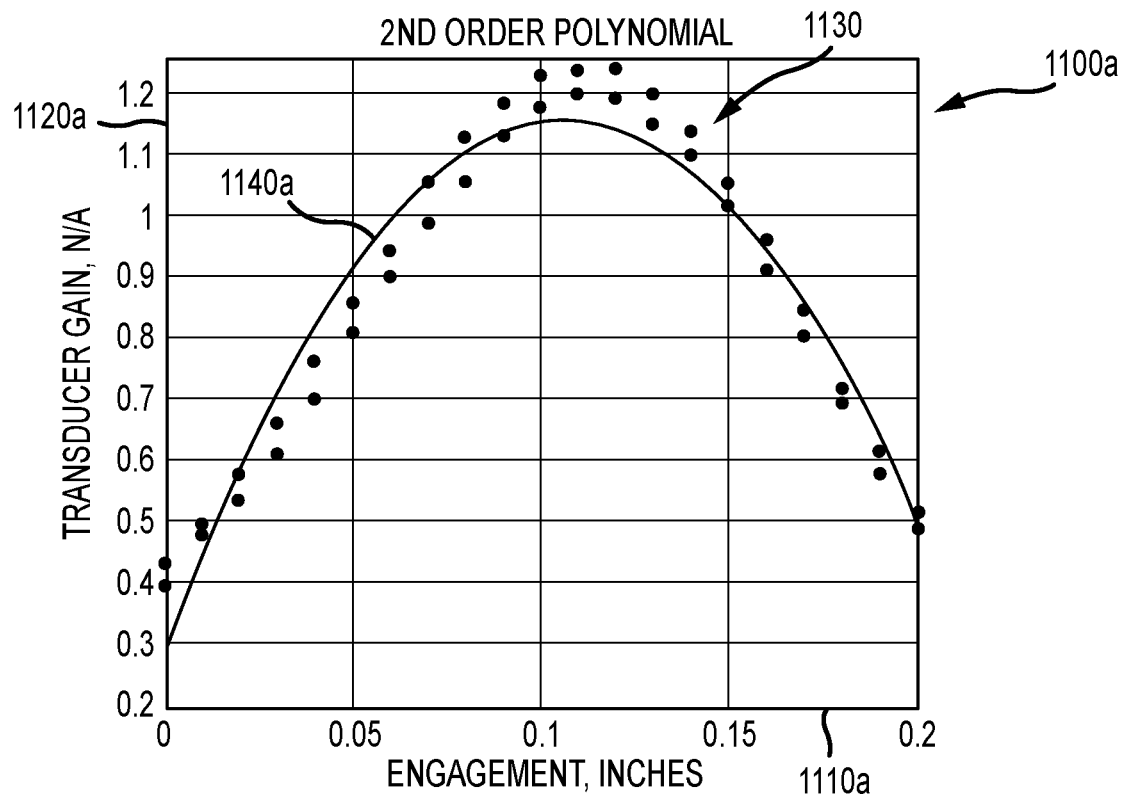
FIGS. 11*a*-11*d* show graphs 1100*a*-1100*d* fitting polynomials of various orders to pull curve data.
Figure 11B:
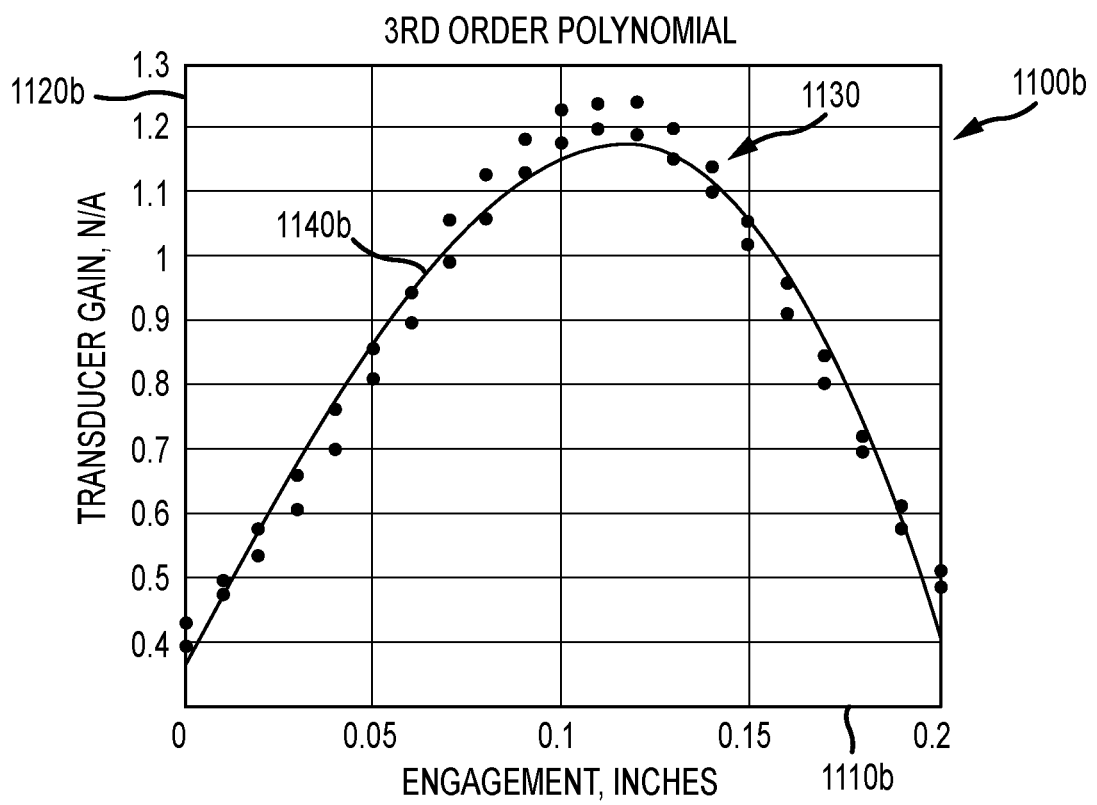
Figure 11C:
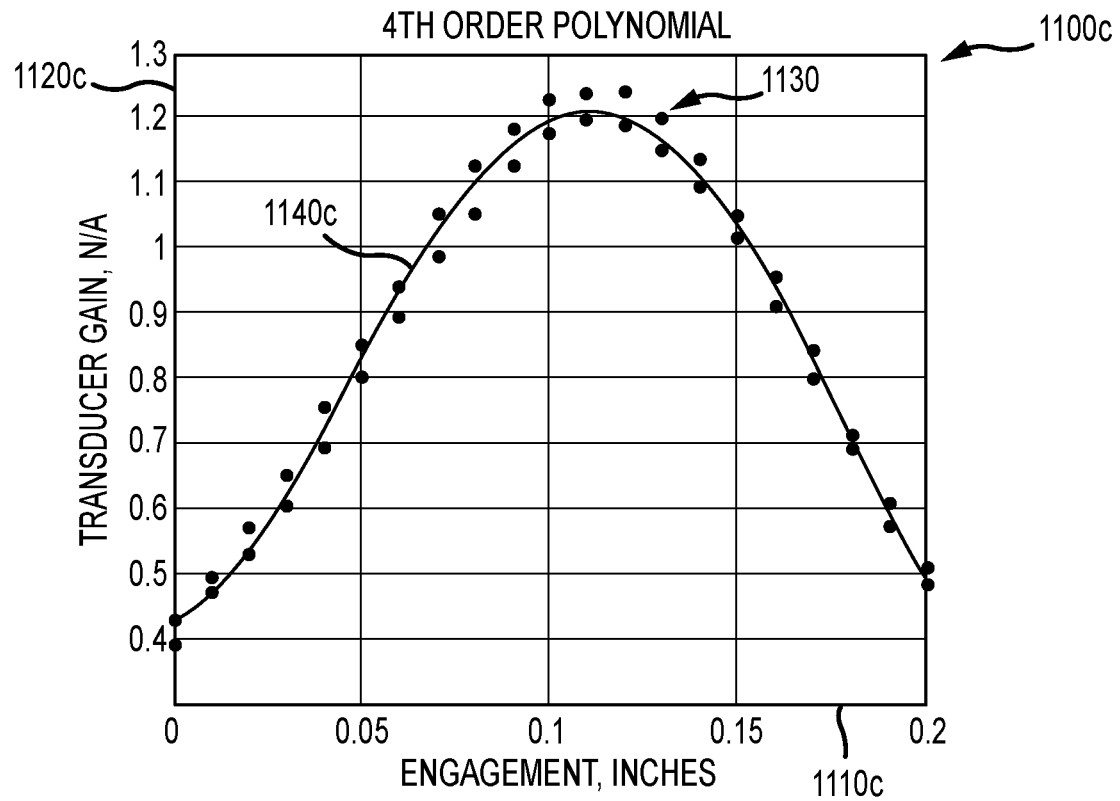
Figure 11D:
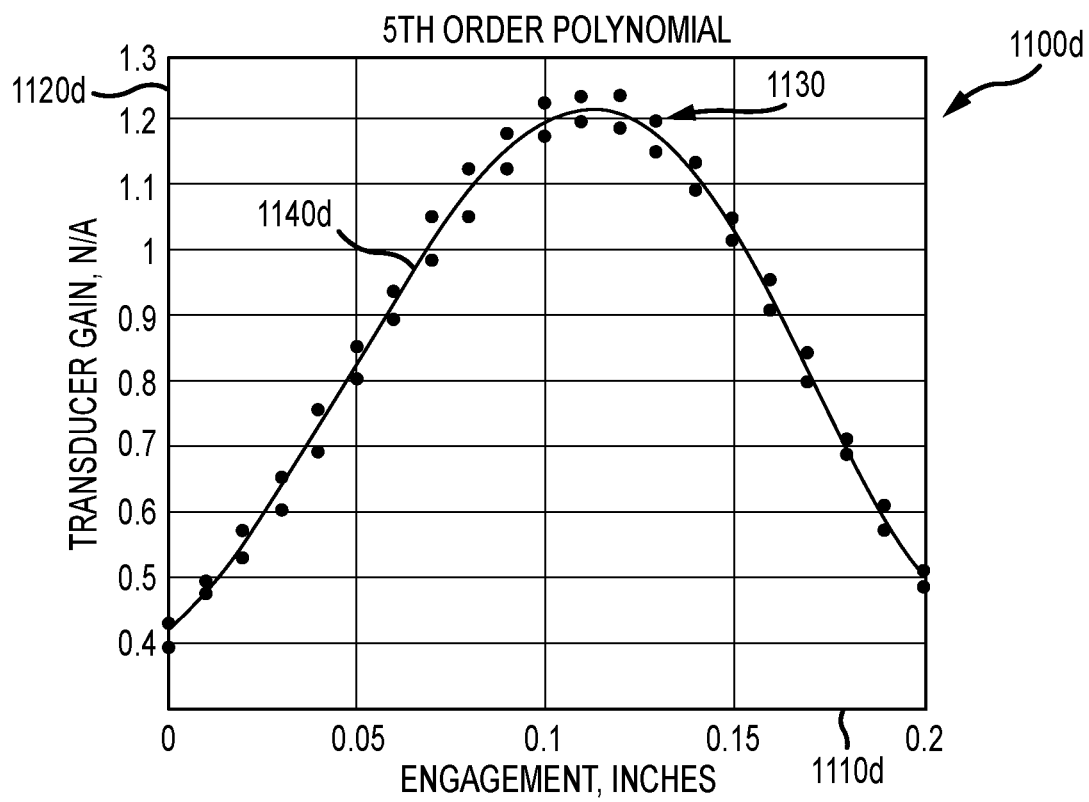

FIGS. 11a-11d show graphs 1100a-1100d fitting polynomials of various orders to pull curve data. In particular, the graph 1100a shown in FIG. 11a is a second order polynomial fit, graph 1100b in FIG. 11b is a third order polynomial fit, graph 1100c in FIG. 11c is a fourth order polynomial fit, and graph 1100d is a fifth order polynomial fit. As can be appreciated, the computational load of combining a multitone input signal with the polynomial as discussed above with reference to equations [6]-[8] is correlated with the order of the polynomial. That is, the higher the order, the greater the computational load.

The graphs 1100a-1100d shown in FIGS. 11a-11d include engagement axes 1110a-1110d, which ranges from 0 to 0.2 inches. An engagement is a length of the magnet that is contained within a coil. For example, if 0.1 inches of the magnet is within the coil, then the engagement is 0.1 inches. The graphs 1100a-1100d also include gain axes 1120a-1120d, which have a range of about 0.2 to about 1.2. The graphs 1100a-1100d include pull curve data 1130a-1130d, which are shown as dots. The pull curve data 1130, which is the same in the graphs 1100a-1100d, may be obtained by measuring the output of an actual transducer as a magnet is inserted into the coil. Transducer gain plots 1140a-1140d in the graphs 1100a-1100d are shown as lines that are proximate the pull curve data 1130.

The pull curve data 1130 is shown as a series of dot pairs that represent a range of values for a given engagement. For example, for an engagement of 0.1 inches, the pull curve data shows two dots that are at about 1.18 and about 1.22. Accordingly, if the transducer gain plots 1140a-1140d lie within a range defined by a dot pair at a given engagement, then the transducer gain plot 1140a-1140d may be fitted to the pull curve data 1130 at that engagement.

As can be seen in FIGS. 1100a-1100d, the transducer gain plots 1140a-1140d vary according to the order of the polynomial. By comparing the transducer gain plots 1140a-1140d to each other relative to how close each transducer gain plots 1140a-1140d are to the pull curve data 1130, a relatively low polynomial order may be chosen. In the example shown in FIGS. 1100a-1100d, the lowest order may be the fourth order polynomial. The fourth order polynomial transducer gain plot 1140c may be chosen by noting that, although the fifth order polynomial transducer gain plot 1140d appears to better fit the pull curve data 1130, the fourth order polynomial transducer gain plot 1140c still lies within all of the dot pairs of the pull curve data 1130 and, therefore, may be considered as fitted to the pull curve data 1130. Accordingly, it may be an optimal use of computational resources to employ the fourth order polynomial transducer gain plot 1140c.

Figure 12:
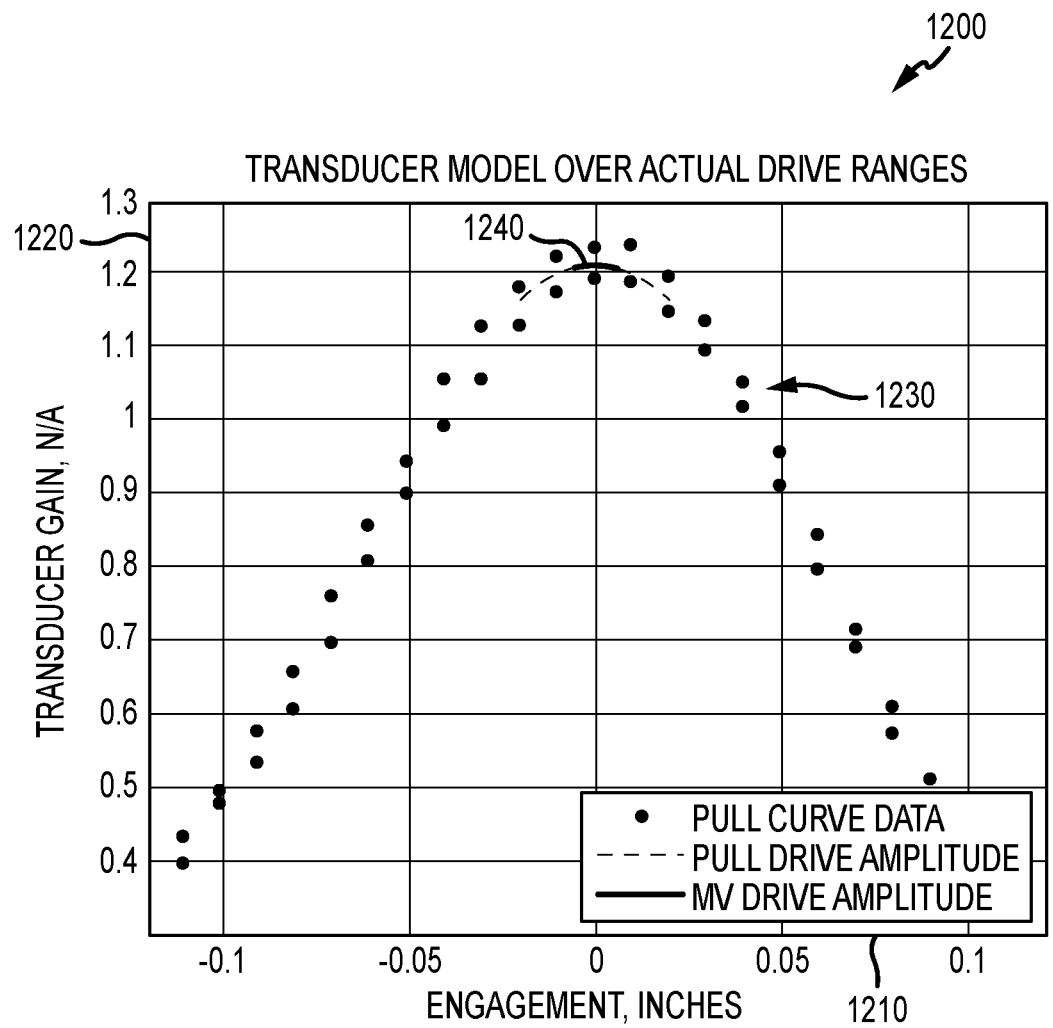
FIG. 12 shows a graph 1200 of the fourth order polynomial transducer gain plot 1140*c* with a limited engagement range.

FIG. 12 shows a graph 1200 of the fourth order polynomial transducer gain plot 1140c with a limited engagement range. The graph 1200 includes an engagement axis 1210 and a transducer gain axis 1220. The graph 1200 also has pull curve data 1230, which is the same as the pull curve data 1130 shown in above FIG. 11c. However, the graph 1200 includes a truncated transducer gain plot 1240, that is the fourth order polynomial transducer gain plot 1140c limited to an engagement range. As shown, the engagement range is about −0.02 inches to about 0.02 inches. The truncated transducer gain plot 1240 includes a full drive amplitude portion (illustrated as dashed lines) and a meter verification amplitude portion (illustrated as a solid line). The meter verification amplitude portion has an engagement range that is less than an engagement range of the full drive amplitude portion.

Filter Design Using the System Model

Figure 13A:
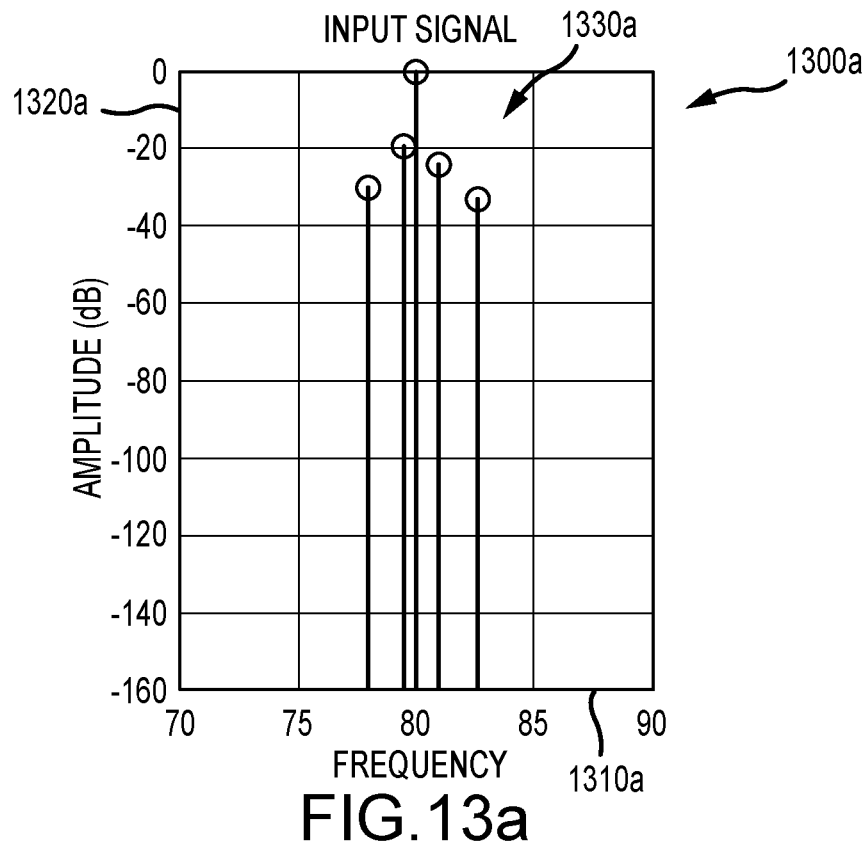
FIGS. 13*a*-13*d* show graphs 1300*a*-1300*d* illustrating a reduction of noise in a vibratory meter.
Figure 13B:
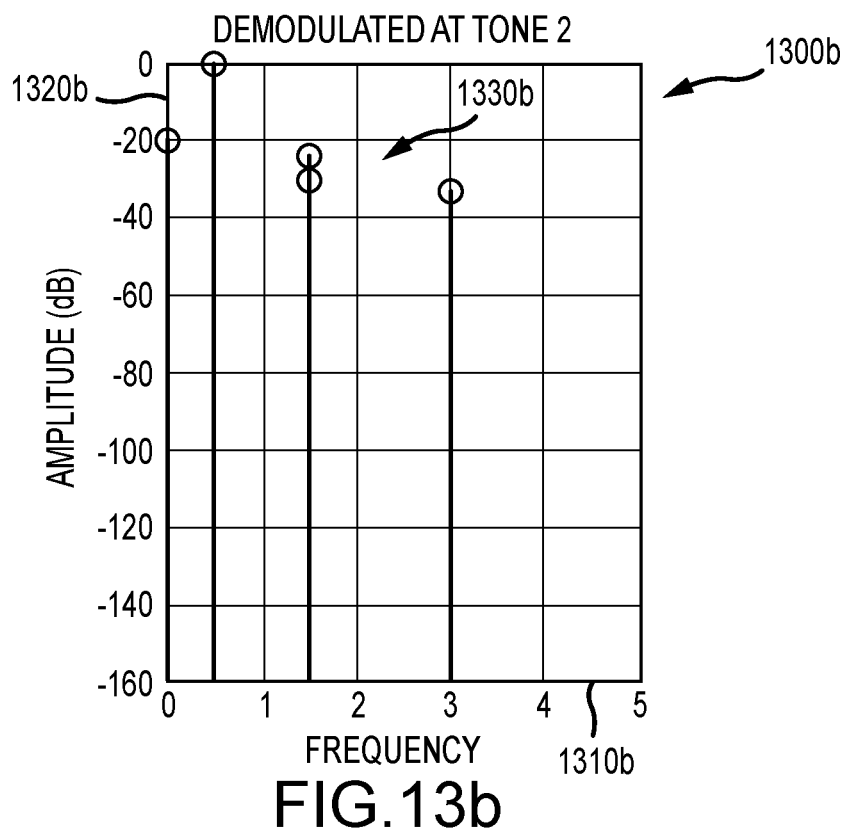
Figure 13C:
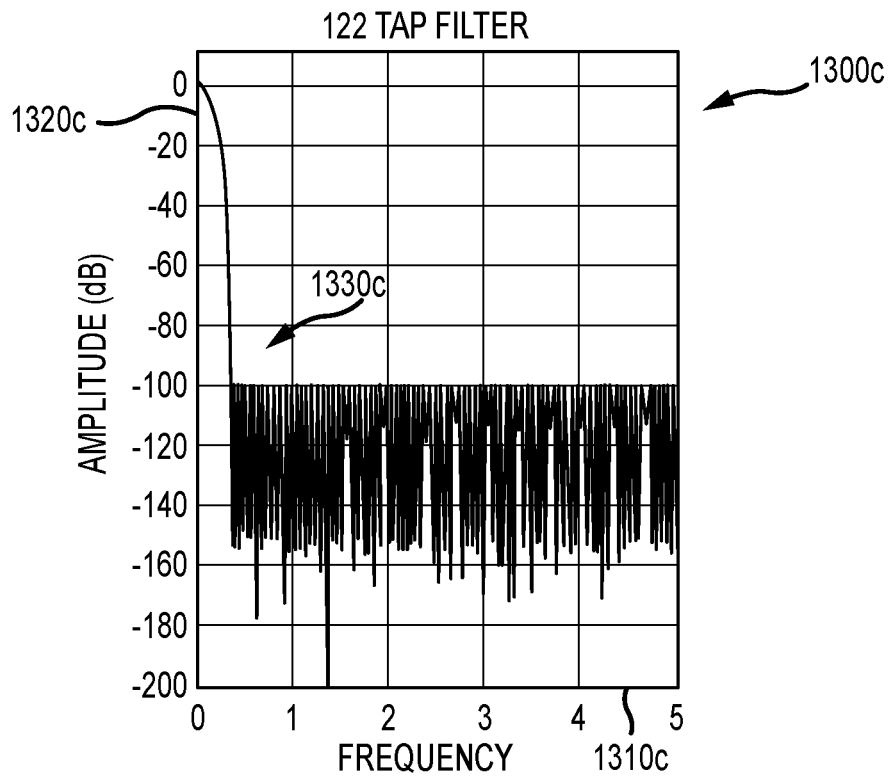
Figure 13D:
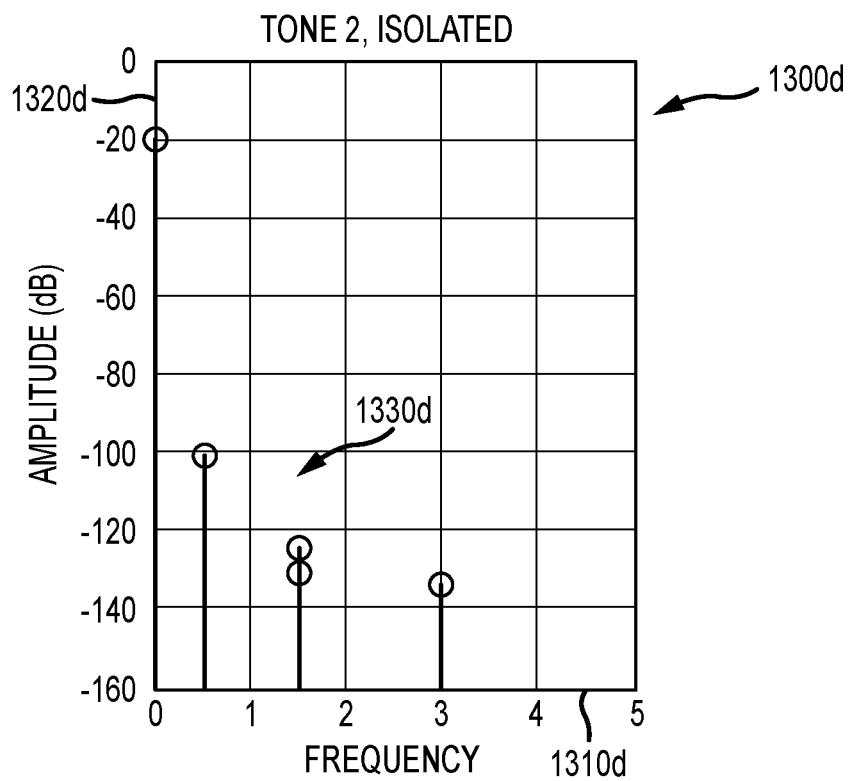

FIGS. 13a-13d show graphs 1300a-1300d illustrating a reduction of noise in a vibratory meter. As shown in FIGS. 13a-13b, the graphs 1300a-1300d include frequency axes 1310a-1310d. In FIG. 13a, the frequency axis 1310a ranges from 70 to 90 Hz. In FIGS. 13b-13d, the frequency axes 1310b-1310d is normalized relative to a second tone or the tone second from the left in FIG. 13a and are therefore in units of Hz relative to the second tone. The graphs 1300a-1300d also include amplitude axes 1320a-1320d with dB scales. In FIGS. 13a, 13b and 13d, the amplitude axes 1320a, 1320b, and 1320d range from −160 to 0 dB. In FIG. 13c, the amplitude axis 1320c ranges from −200 to 0 dB. The graphs 1300a-1300d also include plots, which are described in more detail in the following.

The graph 1300a shown in FIG. 13a includes an input signal 1330a comprised of five tones. The five tones are located at about 77 Hz, 79 Hz, 80 Hz, 82 Hz, and 83 Hz. The tone located at 80 Hz may be a drive tone with frequency that is the same as a resonant frequency of a vibratory sensor, such as, for example, a resonant frequency of the conduits 130, 130' of the vibratory meter 5 shown in FIG. 1. In this case, the resonant frequency is 80 Hz although any suitable resonant frequency and/or drive tone may be employed. The other four tones may be test tones that are mixed with the drive tone.

The graph 1300b shown in FIG. 13b includes a demodulated signal 1330b with tones spaced relative to the test tone located at 79 Hz. More specifically, the output signal 1330b shown in FIG. 13b includes a demodulated tone that corresponds to the test tone located at 79 Hz and, therefore, has an amplitude that is about −20 dB at 0 Hz, as well as the other demodulated tones that are spaced from this demodulated tone. These other demodulated tones are spaced from the demodulated tone at 79 Hz by about 0.5 Hz, 1.5 Hz, and 3 Hz.

The graph 1300c shown in FIG. 13c includes a magnitude response plot 1330c of a filter. The magnitude response plot 1330c of the filter has zero dB attenuation at 0 Hz (which corresponds to the 79 Hz of FIG. 13a). The magnitude response plot 1330c decreases from zero dB to −100 dB over the range of 0 to 0.5 Hz. Accordingly, the filter characterized by the magnitude response plot 1330c will attenuate tones in the input signal 1330a that are spaced from 79 Hz by 0.5 Hz or greater by at least 100 dB. An exemplary attenuation of the output signal 1330b shown in FIG. 13b is described below with reference to FIG. 13d.

The graph 1300d shown in FIG. 13d includes an attenuated output signal 1330d. The attenuated output signal 1330d includes tones that are less than the output tones of the output signal 1330b due to the output signal 1330b being attenuated by the filter characterized by the magnitude response plot 1330c. As can be seen, the tone at 0.5 Hz is attenuated by about −100 dB. This tone is the closest to the 0 Hz frequency and is located proximate a passband of the magnitude response plot 1330c. This is due to the filter being designed while knowing the frequencies of the tones in the input signal 1330a. However, as can be appreciated, the amplitude difference between the tone at 0 Hz, which is at −20 dB, and the tone at 0.5 Hz is about 80 dB, which may not be acceptable.

For the filter characterized by the magnitude response plot 1330c shown in FIG. 13c, the filter design may have, for example, required 122 taps to obtain the 100 dB attenuation of tones 0.5 Hz away, running at a 10 Hz sample rate. This filter integrates data over a 12.2 second time window, and can impose an effective delay of more than 6 seconds when doing real-time processing. Even larger amounts of filter attenuation would be required for cleaner outputs, at the cost of even more filter taps, which may not be acceptable.

FIGS. 14a-14d show graphs 1400a-1400d illustrating a filter that illustrates a reduction of noise in a vibratory meter. The graphs 1400a and 1400b are similar to the graphs 1300a and 1300b shown in FIGS. 13a and 13b, but additionally includes an intermodulation distortion signal. As can be appreciated, the filter of graph 1400c is different than the filter of graph 1300c.

Figure 14A:
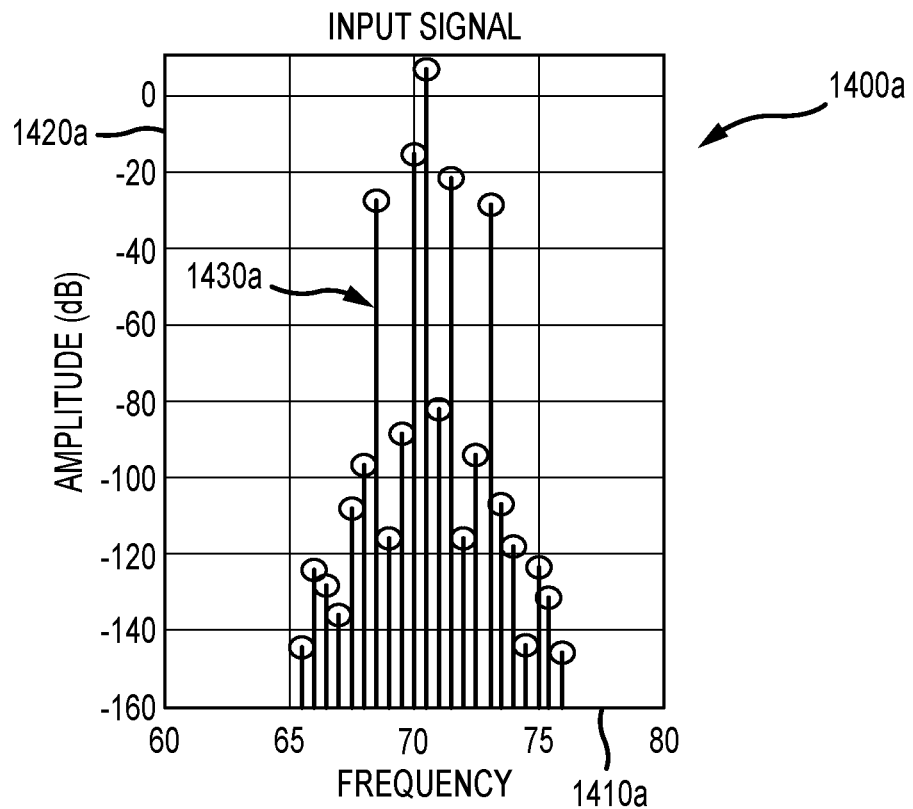
FIGS. 14*a*-14*d* show graphs 1400*a*-1400*d* illustrating a filter that illustrates a reduction of noise in a vibratory meter.
Figure 14B:
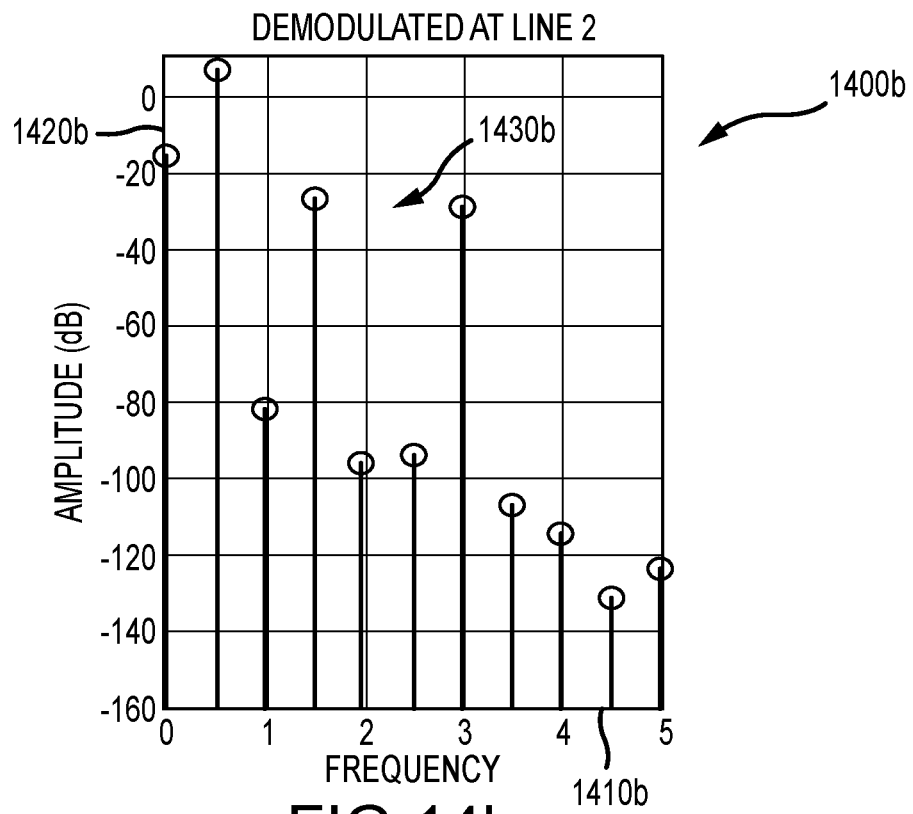
Figure 14C:
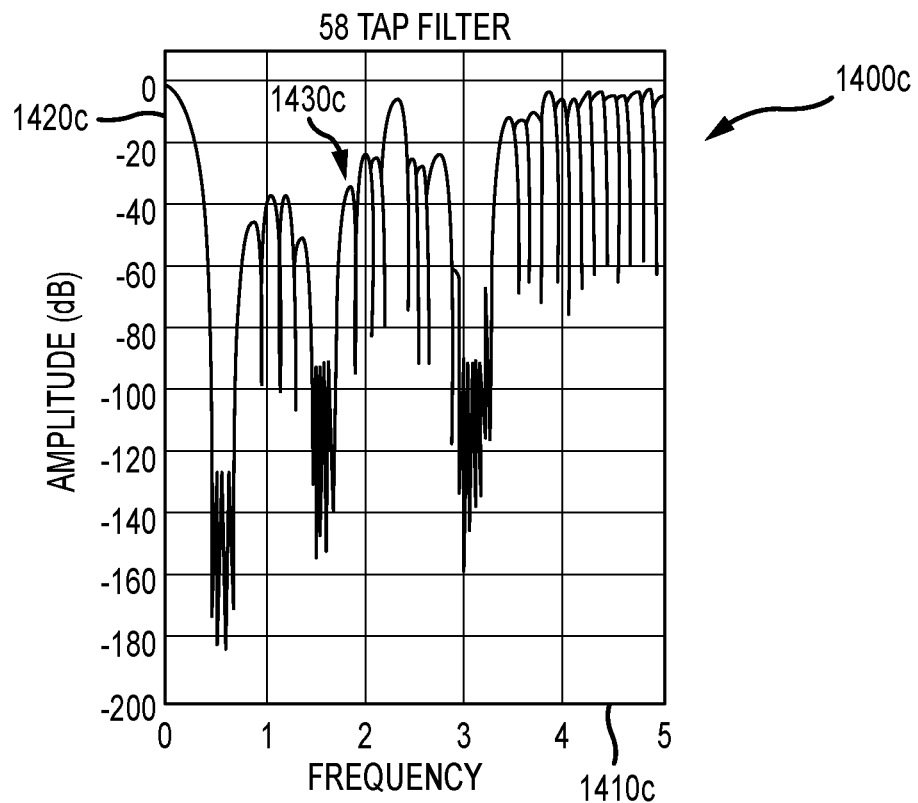
Figure 14D:
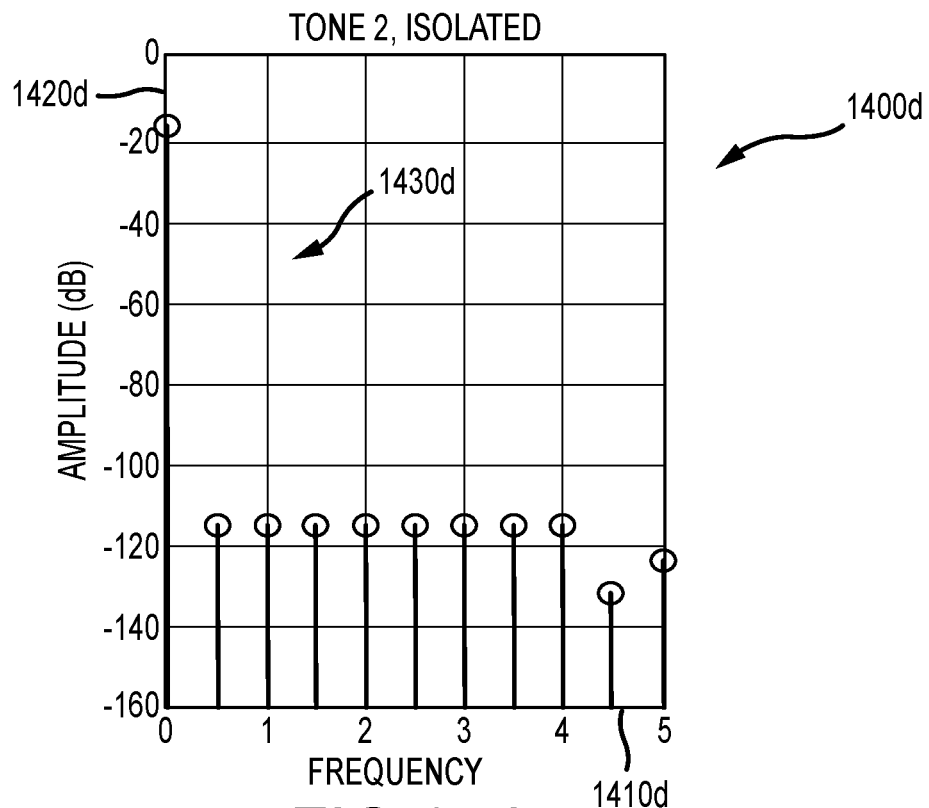

As shown in FIGS. 14a-14d, the graphs 1400a-1400d include frequency axes 1410a-1410d. In FIG. 14a, the frequency axis 1410a ranges from 60 to 80 Hz. In FIGS. 14b-14d, the frequency axes 1410b-1410d is normalized relative to a second tone, or the tone second from the left in FIG. 14a, and are therefore in units of Hz relative to the second tone. The graphs 1400a-1400d also include amplitude axes 1420a-1420d with dB scales. In FIGS. 14a, 14b and 14d, the amplitude axes 1420a, 1420b, and 1420d range from −160 to 0 dB. In FIG. 14c, the amplitude axis 1420c ranges from −200 to 0 dB. The graphs 1400a-1400d also include plots, which are described in more detail in the following.

The graph 1400a shown in FIG. 14a includes an input signal 1430a comprised of five tones. The five tones are located at about 68.5 Hz, 70 Hz, 70.5 Hz, 71.5 Hz, and 73 Hz. The tone located at 70.5 Hz may be a drive tone with frequency that is the same as a resonant frequency of a conduit, such as, for example, the conduits 130, 130' of the vibratory meter 5 shown in FIG. 1. In this case, the resonant frequency is 80 Hz although any suitable resonant frequency and/or drive tone may be employed. The other four tones may be test tones that are mixed with the drive tone.

The graph 1400b shown in FIG. 14b includes a demodulated signal 1430b with demodulated tones that are associated with the test tone located at 70 Hz. More specifically, the demodulated signal 1430b shown in FIG. 14b includes a demodulated tone that corresponds to the test tone located at 70 Hz and, therefore, has an amplitude that is about −18 dB, as well as the other demodulated tones that are spaced from this demodulated tone. These other demodulated tones are spaced from the demodulated tone at 70 Hz by about 0.5 Hz, 1.5 Hz, and 3 Hz.

The graph 1400c shown in FIG. 14c includes a magnitude response plot 1430c of a filter. The magnitude response plot 1430c of the filter has zero dB attenuation at 0 Hz (which corresponds to the 79 Hz of FIG. 14a). The magnitude response plot 1430c decreases from zero dB to about −125 dB over the range of 0 to 0.5 Hz; which is deeper than the magnitude response plot 1330c shown in FIG. 13c. Accordingly, the filter characterized by the magnitude response plot 1430c may attenuate tones that are spaced from 70 Hz at 0.5 Hz or greater, depending on the frequency of the tone. An exemplary attenuation of the demodulated signal 1430b shown in FIG. 14b is described below with reference to FIG. 14d.

The graph 1400d shown in FIG. 14d includes an attenuated signal 1430d with tones with magnitudes that are less than the output tones of the demodulated signal 1430b due to the demodulated signal 1430b being attenuated by the filter characterized by the magnitude response plot 1430c. As can be seen, most of the tones are attenuated to about −118, which is about 100 dB less than the tone at 0 Hz. This is due to the filter being designed with a prediction of the tones in the demodulated signal 1430b.

As can be appreciated, in contrast to the magnitude response plot 1330c shown in FIG. 13c, the magnitude response plot 1430c shown in FIG. 14c includes regions of high attenuation ("valleys") and regions of low attenuation ("hills"). The valleys are centered at frequencies that correspond to the frequencies of the tones in the demodulated signal 1430b. More specifically, the valleys of the magnitude response plot 1430c are centered at 0.5 Hz, 1.5 Hz, and 3 Hz, which is due to the filter being designed to ensure that the valleys are centered as such. The filter characterized by the magnitude response plot 1430c is a lower order filter, compared to the filter described with reference to FIGS. 13a-13d, with 58 taps (5.8 seconds of data, 2.9 seconds of delay). Accordingly, by knowing the frequencies and amplitudes of the tones to be filtered, the computational efficiency of the filter can be improved. This concept can be applied to tones predicted to result from intermodulation distortion of tones in an input signal, as the following discussion illustrates.

In addition to generating the signals to be applied to the drive signal or the sensor signal, the predicted response signal including the perturbations can be used to estimate a transducer model and, more generally, a system model of the sensor assembly, in a way that does not require fitting a polynomial model to pull curve data as discussed with reference to FIGS. 11a-11d. An exemplary system model that is determined using harmonics is discussed in the following.

Determining a System Model Using Harmonics

For convenience, complex-number notations to denote sines and cosines can be used as follows:

$$A \cos \omega t \rightarrow A$$

$$B \cos \omega t \rightarrow jB$$

This notation is to account for the phasing of the harmonics when generating out solutions. Another notational convenience is the use of the symbol R for the coefficients of an expansion of a sinusoid raised to a power. Depending on k (the number of derivatives or integrals between the measurement and nonlinearity space), either $\cos^{p+1} \omega t$ or $\cos \omega t \cdot \sin^p \omega t$ may be expanded. In either case, the term, $$R_{kpf},$$

can be used to denote the coefficient of the expansion power p to a term with frequency f·ω. For instance, a simple application of trigonometric identities will show that $\cos \omega t \cdot \cos^2 \omega t = \cos^2 \omega t = 0.75 \cos \omega t + 0.25 \cos 3\omega t$. Thus, for this case $R_{021}=0.75$ and $R_{023}=0.25$. As an alternate example, consider $\cos \omega t \cdot \sin^2 \omega t = 0.25 \cos \omega t - 0.25 \cos 3\omega t$. In this case, $R_{121}=0.25$ and $R_{123}=-0.25$. Note that for the purpose of defining R it only matters if k is even or odd; that is, $R_{0pf}=R_{2pf}=R_{-4pf}$ and $R_{1pf}=R_{3pf}=R_{-5pf}$. The even values of p produce only odd multiples of the base frequency, and odd values of p produce only even multiples. This can be utilized to simplify the below development.

If k is denoted as the number of derivatives (positive) or integrals (negative) from the measurement space to the nonlinearity space, then the amplitude in the nonlinearity space is written as $s_k A \omega^k$, where A is the original signal's amplitude and $s_k$ is the appropriate sign (a closed form equation can be computed as, for example, $$s_k = 1 - 2\mathrm{mod}[\mathrm{ceil}(k/2), 2]).$$

For example, if the original acceleration signal was $A \cos \omega t$, then its position is $$-\frac{A}{\omega^2} \cos \omega t.$$

In the simplified notation, this is the cosine of amplitude $s_{-2} A \omega^{-2} = -A \omega^{-2}$. As another example, a position of $A \cos \omega t$ becomes a velocity of $-A \sin \omega t$, or in our simplified notation a sine with amplitude of $s_1 A \omega^1 = A \omega$. Additional notations include a non-linear polynomial expressed as $y = P_n x^n + P_{n-1} x^{n-1} + \ldots + P_1 x + P_0$, and a system response to a tonal input $A \cos \omega t$ is written as $H_0 + H_1 \cos \omega t + H_2 \cos 2\omega t + \ldots + H_n \cos n\omega t$. Sine components can be incorporated via imaginary values of the coefficients of H.

A matrix equation for computing an output of a nonlinear system to a pure tonal input $A \cos \omega t$ may be written. The equations for a fourth order non-linearity polynomial will be developed. This system is nonlinear in a particular space k from the input measurement (negative k for integrals). The set of equations can be written as:

$$\begin{bmatrix} A^5(s_k\omega^k)^4 R_{41} & 0 & A^3(s_k\omega^k)^2 R_{21} & 0 & AR_{01} \\ 0 & A^4(s_k\omega^k)^3 R_{32} & 0 & A^2(s_k\omega^k) R_{12} & 0 \\ A^3(s_k\omega^k)^4 R_{43} & 0 & A^3(s_k\omega^k)^2 R_{23} & 0 & 0 \\ 0 & A^4(s_k\omega^k)^3 R_{34} & 0 & 0 & 0 \\ A^3(s_k\omega^k)^4 R_{45} & 0 & 0 & 0 & 0 \end{bmatrix} \quad [9]$$

$$\begin{bmatrix} P_4 \\ P_3 \\ P_2 \\ P_1 \\ P_0 \end{bmatrix} = \begin{bmatrix} H_1 \\ H_2 \\ H_3 \\ H_4 \\ H_5 \end{bmatrix}$$

A represents the "true" underlying behavior, independent of the nonlinear dynamics of the system. Without measurements from the underlying system, A is not directly known.

To address this issue, measurements may be provided in meaningful units; that is, a user, for example, may need to scale the measurements to real, physical, units to give the correct results (in essence forcing them to assume the true amplitude). More specifically, though, the math assumes that coefficient $P_0=1$. $P_0$ represents the y-intercept of the nonlinearity polynomial; thus, an assumption is made that the provided measurements are correct "at rest" (at position 0). Another way of looking at this is that the user's measurements must approach the "true" values at infinitesimally small amplitudes.

With this assumption, the system becomes solvable. The procedure may be, for example:

1. Solve for an intermediate set of variables, $P_r A^{r+1}$
2. Back out from the solution for $P_0 A$, assuming $P_0=1$
3. Substitute the computed value of A into [9] and resolve for the coefficients $P_r$, or simply apply the known value of A to the solutions from step 1 to compute $P_r$.

The non-linear model, however determined, can be used to compensate for the noise in the vibratory meter, as is discussed in the following.

Compensating Signal

As discussed above, the transducer can be modeled as a non-linear transducer, such as the case of equation [2], reproduced below:

$$k(x) = 1 - x^2. \quad [10]$$

The sensor signal received from the sensor assembly can be measured and multiplied to an inverse of the above equation [10]. More specifically, using the above equation [10] as an example, the following relationship can be established:

$$y(t) = \dot{x}(t)[1 - x^2(t)] \rightarrow \frac{y(t)}{[1 - x^2(t)]} = \dot{x}(t), \quad [11]$$

which can be referred to as "inverse weighting."

In inverse weighting, the inverse of the transducer model multiplied by the transducer model is identity. Therefore, the response of the transducer model is linearized so that motion in is equal to motion out with no perturbations—such as the components, or tones, in the response signal that result from the intermodulation distortion of the tones in the drive signal. That is, the response signal is comprised of the tones that correspond to the drive and test tones in the drive signal.

Using this inverse weighting concept, an inversely weighted signal can be determined from taking a desired response, such as the response signal comprised of tones corresponding to the tones in the drive signal provided to the sensor assembly, divide the desired response by the transducer model to obtain an inverse weighted signal, and provide this inversely weighted signal to the sensor assembly. Accordingly, the response signal may not include tones that result from intermodulation distortion of the tones in the drive signal. This inverse weighted signal that is provided to the sensor assembly is a compensatory signal.

The signal that is applied to the sensor signal may be a canceling signal. In a manner similar to generating the inverse weighted signal, the transducer model can be used to determine the response signal that is comprised of the tones that correspond to the drive tone and test tones in the drive signal without the perturbations. This response signal can be used to remove tones generated by the non-linear transducer model, which include the tones corresponding to the drive and test tones of the drive signal as well as the tones generated due to intermodulation distortion of the tones in the drive signal. Accordingly, the canceling signal is comprised of the tones generated due to intermodulation distortion of the tones in the drive signal. This canceling signal can be generated by electronics, such as the meter electronics 20, and applied to the sensor signal to cancel the components or tones that result from intermodulation distortion of the tones in the drive signal that is applied to the sensor assembly.

Figure 15:
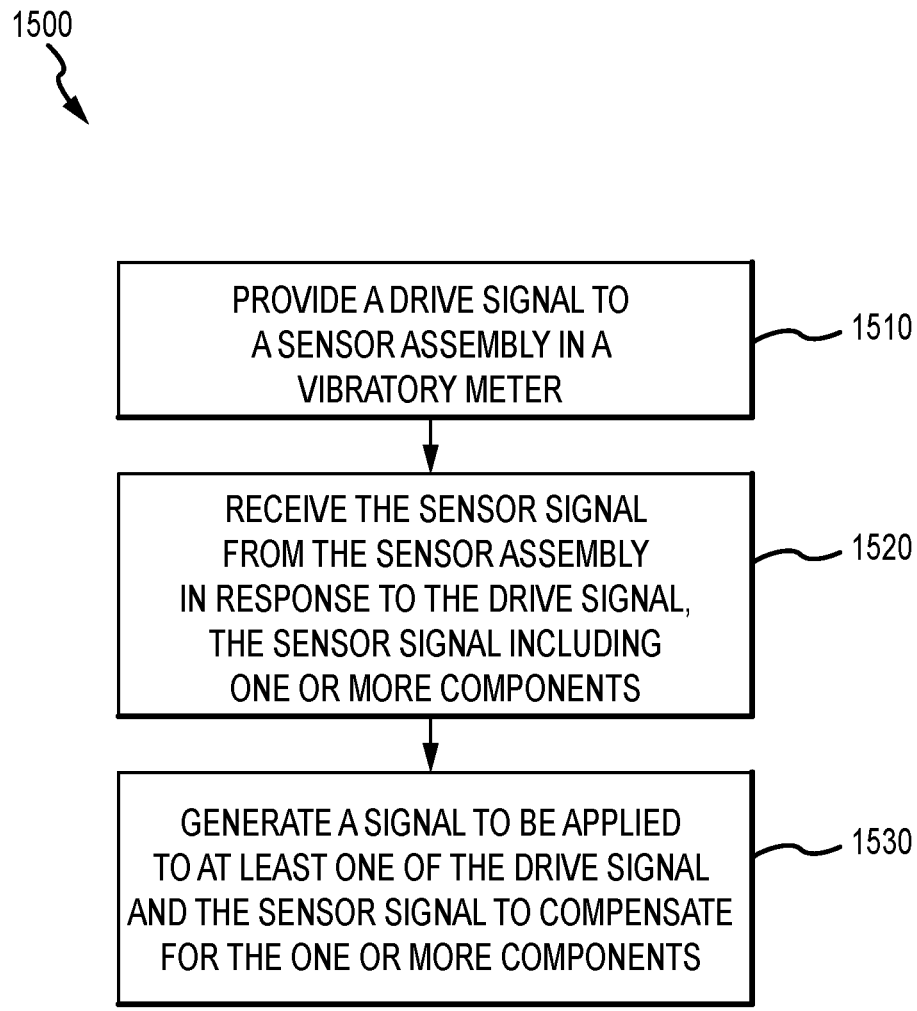
FIG. 15 shows a method 1500 for predicting and reducing noise in a vibratory meter.

FIG. 15 shows a method 1500 for predicting and reducing noise in a vibratory meter. The method 1500 begins by providing a drive signal to a sensor assembly in a vibratory meter in step 1510. The drive signal may include test tones, such as the test tones discussed above with reference to FIGS. 3 and 13*a*, although any suitable drive signal may be provided. In step 1520, the method 1500 receives the sensor signal from the sensor assembly in response to the drive signal. The sensor signal includes one or more components. The one or more components may include tones that correspond to the test tones in the drive signal as well as noise, such as intermodulation distortion signals, harmonics, or the like that are induced by the sensor assembly 10. For example, the intermodulation distortion signals may be induced by a transducer such as a pick-off sensor 170*l*, 170*r* in the sensor assembly 10. In step 1530, the method 1500 generates a signal to be applied to at least one of the drive signal and the sensor signal to compensate for the one or more components. The method 1500 can be implemented by any system. An exemplary system is described in the following.

Figure 16:
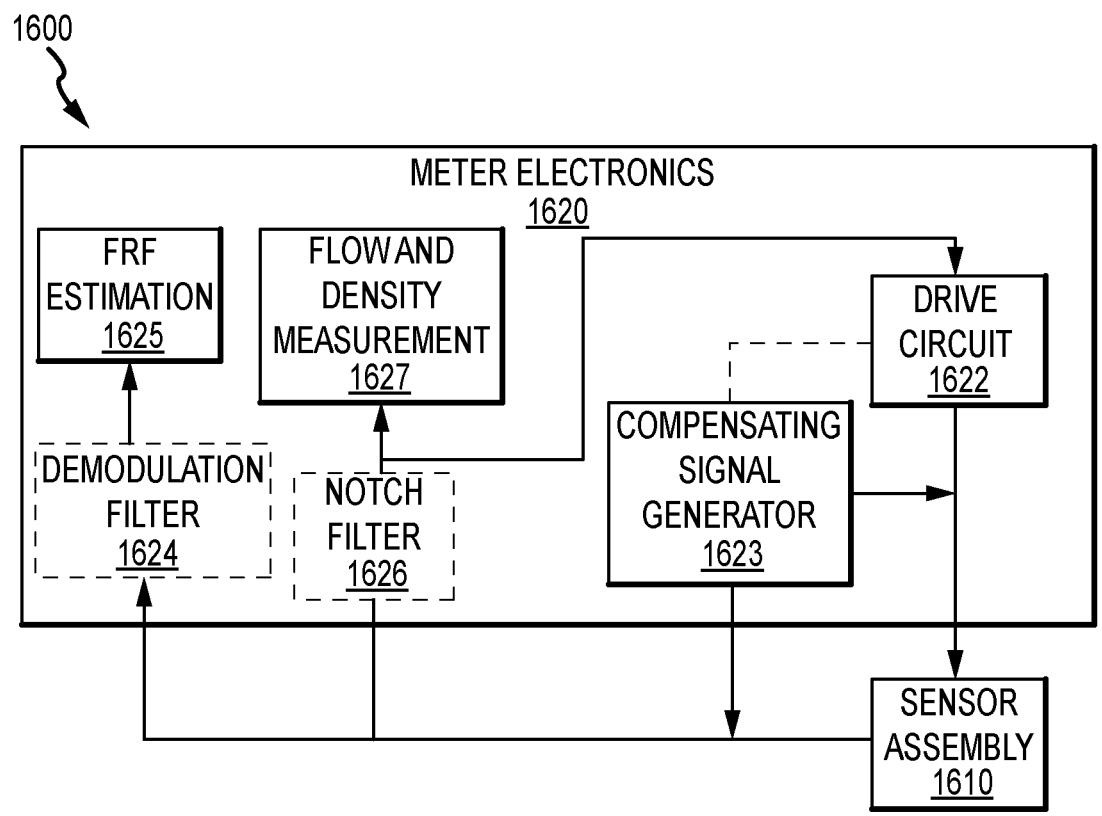
FIG. 16 shows a block diagram of a vibratory meter 1600 configured to predict and reduce noise in the vibratory meter.

FIG. 16 shows a block diagram of a vibratory meter 1600 configured to predict and reduce noise in the vibratory meter. The vibratory meter 1600 includes a sensor assembly 1610 and a meter electronics 1620. As shown in FIG. 16, the sensor assembly 1610 is communicatively coupled to the meter electronics 1620. The meter electronics 1620 includes a drive circuit 1622 that provides a drive signal to the sensor assembly 1610. The sensor assembly 1610 is communicatively coupled with and provides sensor signals to the meter electronics 1620. A compensating signal generator 1623 is communicatively coupled to the drive circuit 1622 and the sensor assembly 1610. Although the compensating signal generator 1623 is shown as being distinct from the other components in the meter electronics 1620, the compensating signal generator 1623 may be part of, for example, the drive circuit 1622. A demodulation filter 1624 receives the sensor signals from the sensor assembly 1610 and passes signals that are within a demodulation window or windows of the demodulation filter 1624. The signals passed by the demodulation filter 1624 are provided to an FRF estimation unit 1625. A notch filter 1626 also receives the sensor signal, which passes a resonant component to the drive circuit 1622 and a flow and density measurement module 1627, which can determine a fluid property of a fluid.

The sensor assembly 1610 may be a model representing the sensor assembly 10 described in the foregoing with reference to FIG. 1. Alternatively, the sensor assembly 1610 may be an actual sensor assembly that receives an electrical drive signal from the drive circuit 1622. In either case, the sensor assembly 1610 receives the multi-tone drive signal from the meter electronics 1620 and provides the sensor signal to the meter electronics 1620 to characterize the sensor assembly 1610. The multi-tone drive signal is therefore an input to a frequency response of the sensor assembly 1610 and the sensor signal is an output of the frequency response of the sensor assembly 1610. By comparing the input and the output, the frequency response of the sensor assembly 1610 may be characterized. Further, an analytical solution may be formulated by, for example, fitting a curve to the characterization of the sensor assembly 1610.

The drive circuit 1622 may be comprised of a feedback circuit that tracks the frequency of the resonant component and adjusts the frequency of the drive tone of the drive signal provided to the sensor assembly 1610. The drive circuit 1622 may also include a signal generator, amplifier, or the like that generates or provides the drive signal, which can be a multi-tone drive signal comprising the drive tone and test tones.

The compensating signal generator 1623 is configured to generate and provide an inverse weighted signal to the sensor assembly 1610 or a canceling signal to the sensor signal provided by the sensor assembly 1610. The compensating signal generator 1623 can generate the inverse weighed signal and the canceling signal using any suitable means employing a system model, such as a transducer model. For example, as discussed above, a transducer model can have an input and output relationship that is defined as a polynomial.

The inverse weighted signal that is applied to the sensor assembly 1610 is generated by determining a desired output. For example, the desired output may be a sensor signal from the sensor assembly 1610 that is only comprised of components that correspond to, for example, the test tones 640 shown in FIG. 6. In other words, the desired output is a sensor signal does not include the intermodulation distortion signals 650 shown in FIG. 6.

The compensating signal generator 1623 can generate the inversely weighted signal by multiplying the desired output by an inverse of the system model. For example, in the relationship shown in the above equation [11], $[1-x^2(t)]$ is the system model. The inverse of the system model is shown as the $$\frac{1}{[1-x^2(t)]}$$

term. The inversely weighted signal is then applied to the sensor assembly 1610 to obtain the desired output or sensor signal.

The compensating signal generator 1623 can generate the canceling signal to be applied to the sensor signal provided by the sensor assembly 1610. For example, as discussed above, the compensating signal generator 1623 can determine a response signal using a system model. For example, with reference to the above equation [9], the non-linear model of a transducer can be used to determine an output or sensor signal that includes one or more components, such as the tones corresponding to, for example, the first signal 630 and the test tones 640 as well as the intermodulation distortion tones 650. The tones corresponding to the first signal 630, which is the drive tone, and the test tones 640 can be removed from this output to only leave the intermodulation distortion tones 650. This is the cancelling signal that is applied to the sensor signal provided by the sensor assembly 1610. The cancelling signal is a compensating signal.

Although the above discusses the use of compensating signals to prevent the intermodulation distortion signals from being present in the sensor signal provided by the sensor assembly 1610, the sensor signal may still have some intermodulation distortion signals present due to, for example, frequency drift of the drive signal and test tones in the drive signal. Accordingly, filtering may still be used in the vibratory meter 1600, as is shown in FIG. 16.

The demodulation filter 1624 passes signals that are within the demodulation windows. For example, with reference to FIG. 6, the demodulation filter 1624 passes signals that are within the demodulation windows 660b-660e. Still referring to FIG. 6, the intermodulation distortion signals 650 are not within the demodulation windows 660b-660e and are therefore not passed by the demodulation filter 1624. As a result, the meter electronics 1620 can accurately verify the sensor assembly 1610 with the second through fifth signals 640a-640d.

Since the intermodulation distortion signals 650 may only be present when the test tones 640 are employed during meter verification, the demodulation filter 1624 and the notch filter 1626 may not be employed during production operation of the vibratory meter 1600. More specifically, during operation, the vibratory meter 1600 may only provide a single component signal comprised of a sinusoidal signal having a frequency at the resonant frequency of the sensor assembly 1610.

Figure 17:
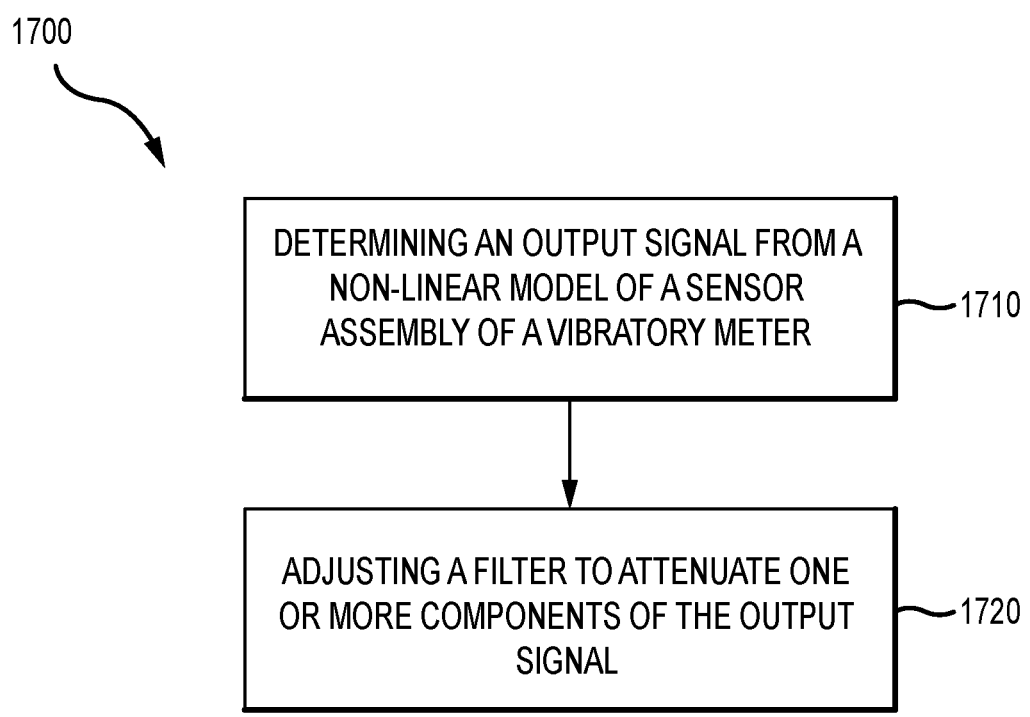
FIG. 17 shows a method 1700 for predicting and reducing noise in a vibratory meter.

FIG. 17 shows a method 1700 for predicting and reducing noise in a sensor signal of a vibratory meter. As shown in FIG. 17, the method 1700 determines an output signal from a non-linear model of a sensor assembly of the vibratory meter in step 1710. The output signal may be in response to an input signal having two or more components. The method 1700, in step 1720, adjusts a filter to attenuate one or more components in the output signal.

The one or more components in the output signal from the non-linear model may be comprised of intermodulation distortion signals and/or harmonics. For example, the output signal may include tones similar to those shown in FIG. 14c. That is, the input signal 1430a to the filter is an output from the non-linear model. The non-linear model can be any suitable mode and determined using any suitable means. For example, the non-linear model may be a gain-position model of a transducer in the sensor assembly, such as the gain-position model shown in FIG. 7. As can be appreciated, the one or more components may be comprised of tones that are spaced apart from each other, such as the input signal 1430a shown in FIG. 14a, which may be an output from the non-linear model and an input to a filter.

In step 1720, the filter may be adjusted by adjusting a frequency of one or more stop-bands of a magnitude response of the filter to be substantially centered at the frequencies of the one or more components in the output signal. For example, with reference to the filter shown in FIG. 14c, the frequencies of the stop-bands, which are the valleys and hills of the magnitude response plot 1430c, are centered at about the frequencies of the demodulated signal 1430b shown in FIG. 14b, which is an output of the non-linear model and an input to the filter characterized by the magnitude response plot 1430c.

Additionally, an attenuation of at least one stop-band may be adjusted to reduce the one of the one or more components to a desired amplitude. For example, referring again to FIG. 14c, the amplitude of each stop-band in the magnitude response plot 1430c is adjusted such that the amplitude of the filter's output is at a desired amplitude. As shown in FIG. 14d, the desired amplitude of the attenuated signal 1430d, which is the filter's output, is generally about −118 dB even though the demodulated signal included tones that ranged from about +10 dB to −118 dB.

Adjusting the filter can include reducing the number of taps of the filter. For example, the filter characterized by the magnitude response plot 1330c shown in FIG. 13c may require 122 taps. The filter characterized by the magnitude response plot 1430c shown in FIG. 14c has 58 taps. As a result, the 58 tap filter utilizes fewer computing resources, thereby improving an operation of a meter electronics, such as the meter electronics 20 described above.

The above described embodiments provide a vibratory meter 5, 1600 and method 1500 that can determine and reduce noise in the vibratory meter 5, 1600. The noise may be components in the sensor signal, such as intermodulation distortion signals, harmonics, or the like, that are caused by a sensor assembly 10, 1610, or sensors, such as pick-off sensors 170l, 170r, in the vibratory meter 5, 1600. The noise can be predicted by using a system model, such as a non-linear transducer model of pick-off sensors 170l, 170r. By predicting the noise, the noise can be reduced.

For example, a compensating signal may be generated by using the system model. The compensating signal can prevent the formation of or cancel the noise in the sensor signal. Accordingly, filters such as the notch filter 1626, may not be necessary. Additionally or alternatively, the filters can be designed or selected by using the predicted noise. For example, the stop band frequencies of the filters can be centered where components, such as tones, are located. Accordingly, the filter design can be a lower ordered filter that is more computationally efficient and/or attenuate or reduce the noise to a desirable magnitude. Accordingly, the operation of the meter electronics 20, 1620 is improved by reducing or eliminating the need for complex filters.

Additionally, the operation of the vibratory meter 5, 1600 is improved by reducing or attenuating the noise to a desirable level thereby improving the technical process of meter verification. For example, reducing the noise can minimize or prevent noise from interfering with the components in the sensor signal that are used to perform meter verification. As a result, the technical process of meter verification is improved by providing more accurate measurements of stiffness, mass, residual flexibility, or the like, of the conduits 130, 130' in the sensor assembly 10. The operation of the meter electronics 20 can also be improved by reducing the number of taps in a filter that is employed in the meter electronics. As discussed above, the number of taps can be reduced by determining the components in an output signal from a non-linear model, such as intermodulation distortion signals, and adjusting stop-bands of the filter to be centered at the frequencies of the components.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other embodiments predicting and reducing noise in a vibratory meter. Accordingly, the scope of the embodiments described above should be determined from the following claims.

We claim:

1. A vibratory meter (5, 1600) configured to predict and reduce noise in the vibratory meter (5, 1600), the vibratory meter (5, 1600) comprising:
a sensor assembly (10, 1610); and
a meter electronics (20, 1620) in communication with the sensor assembly (10, 1610), the meter electronics (20, 1620) being configured to:
provide a drive signal to a sensor assembly (10, 1610);
receive a sensor signal from the sensor assembly (10, 1610) having one or more components; and
generate a compensating signal to be applied to one of the sensor signal and the drive signal to compensate for the one or more components;
wherein the meter electronics (20, 1620) being configured to generate the compensating signal to be applied to one of the sensor signal and the drive signal comprises generating the compensating signal based on a system model of the sensor assembly (10, 1610).

2. The vibratory meter (5, 1600) of claim 1, wherein the system model of the sensor assembly (10, 1610) comprises a non-linear model of a transducer in the sensor assembly (10, 1610).

3. The vibratory meter (5, 1600) of claim 1, wherein the meter electronics (20, 1620) being configured to generate the compensating signal to be applied to the drive signal comprises generating the compensating signal to induce a motion in the sensor assembly (10, 1610) that substantially prevents the one or more components in the sensor signal from forming.

4. The vibratory meter (5, 1600) of claim 1, wherein the meter electronics (20, 1620) being configured to generate the compensating signal to be applied to the sensor signal comprises generating the compensating signal to cancel the one or more components in the sensor signal.

5. The vibratory meter (5, 1600) of claim 1, wherein the one or more components comprise at least one of intermodulation distortion signals and harmonic signals.

6. The vibratory meter (5, 1600) of claim 1, wherein the drive signal comprises a multi-tone drive signal including a drive tone and one or more test tones for verifying the sensor assembly.

7. The vibratory meter (1600) of claim 1, wherein the meter electronics (1620) comprises a compensating signal generator (1623) configured to generate the compensating signal to be applied to the one of the sensor signal and the drive signal to compensate for the one or more components.

8. A method of reducing noise in a sensor signal in a vibratory meter, the method comprising:
providing a drive signal to a sensor assembly in the vibratory meter;
receiving the sensor signal from the sensor assembly in response to the drive signal, the sensor signal including one or more components; and
generating a compensating signal to be applied to at least one of the drive signal and the sensor signal to compensate for the one or more components;
wherein generating the compensating signal to be applied to one of the sensor signal and the drive signal comprises generating the compensating signal based on a system model of the sensor assembly.

9. The method of claim 8, wherein the system model of the sensor assembly comprises a non-linear model of a transducer in the sensor assembly.

10. The method of claim 8, wherein generating the compensating signal to be applied to the drive signal comprises generating the compensating signal to induce a motion in the sensor assembly that substantially prevents the one or more components in the sensor signal from forming.

11. The method of claim 8, wherein generating the compensating signal to be applied to the sensor signal comprises generating the compensating signal to cancel the one or more components in the sensor signal.

12. The method of claim 8, wherein the one or more components comprise at least one of intermodulation distortion signals and harmonic signals.

13. The method of claim 8, wherein the drive signal comprises a multi-tone drive signal including a drive tone and one or more test tones for verifying the sensor assembly.

14. The method of claim 8, wherein the compensating signal to be applied to the one of the sensor signal and the drive signal to compensate for the one or more components is generated by a compensating signal generator in a meter electronics of the vibratory meter.

15. A method of predicting and reducing noise in a sensor signal in a vibratory meter, the method comprising:
determining an output signal from a non-linear model of a sensor assembly of the vibratory meter, the output signal being in response to an input signal having two or more components; and
adjusting a filter to attenuate one or more components in the output signal.

16. The method of claim 15, wherein adjusting the filter to attenuate the one or more components in the output signal comprises adjusting a frequency of one or more stop-bands of a magnitude response of the filter to be substantially centered at the frequencies of the one or more components in the output signal.

17. The method of claim 15, wherein adjusting the filter to attenuate the one or more components in the output signal comprises adjusting an attenuation of at least one stop-band to reduce the one or more components to a desired amplitude.

18. The method of claim 15, wherein adjusting the filter to attenuate the one or more components in the output signal comprises reducing the number of taps of the filter.

19. The method of claim 15, wherein the non-linear model of the sensor assembly comprises a non-linear model of a transducer of the sensor assembly.

20. The method of claim 15, wherein the non-linear model of the sensor assembly is a gain-position model of the sensor assembly.

21. The method of claim 15, wherein the one or more components of the input signal comprises one or more tones spaced apart from each other.

22. The method of claim 15, wherein determining the output signal from a non-linear model in response to the input signal having two or more components comprises determining at least one of an intermodulation distortion signal and a harmonic signal in the output signal.

\* \* \* \* \*

UNITED STATES PATENT AND TRADEMARK OFFICE
CERTIFICATE OF CORRECTION

PATENT NO. : 11,796,363 B2
APPLICATION NO. : 16/639680
DATED : October 24, 2023
INVENTOR(S) : Matthew Joseph Rensing et al.

Page 1 of 1

It is certified that error appears in the above-identified patent and that said Letters Patent is hereby corrected as shown below:

In the Specification

Column 12, Line 49, replace "as a vector $P=[-1>10^{-10}\ -1\times10^{-8}\ -1\times10^{-6}$" with --as a vector $P=[-1\times10^{-10}\ -1\times10^{-8}\ -1\times10^{-6}$--

Column 17, Line 26, replace "consider $cos\omega t \cdot sin^2\omega t = 0.25cos\omega t \cdot 0.25cos3\omega t$." with --consider $cos\omega t \cdot sin^2\omega t = 0.25cos\omega t - 0.25cos3\omega t$.--

Column 17, Line 55, replace "a sine with amplitude of $s_1A\omega^1 = A\omega$" with --a sine with amplitude of $s_1A\omega^1 = -A\omega$--

Signed and Sealed this
Twenty-first Day of January, 2025

Coke Morgan Stewart
*Acting Director of the United States Patent and Trademark Office*